US012795487B2

(12) United States Patent
Mueller et al.

(10) Patent No.: US 12,795,487 B2
(45) Date of Patent: Nov. 10, 2026

(54) INTELLIGENTLY SELECTING PRIVATE RADIO-BASED NETWORKS OR PROVIDER-OPERATED RADIO-BASED NETWORKS

(71) Applicant: Amazon Technologies, Inc., Seattle, WA (US)

(72) Inventors: Julius Mueller, Santa Cruz, CA (US); Sigit Priyanggoro, Plano, TX (US); Upendra Bhalchandra Shevade, Washington, DC (US); Benjamin Wojtowicz, Miami, FL (US); Umer Amin Chaudhary, Dublin, CA (US); Amir Muhammad Rao Sultan, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 701 days.

(21) Appl. No.: 18/326,949

(22) Filed: May 31, 2023

(65) Prior Publication Data

US 2024/0406825 A1 Dec. 5, 2024

(51) Int. Cl.
*H04W 36/14* (2009.01)
*H04W 36/00* (2009.01)

(52) U.S. Cl.
CPC .... *H04W 36/14* (2013.01); *H04W 36/008375* (2023.05)

(58) Field of Classification Search
CPC ......... H04W 36/14; H04W 36/008375; H04W 36/304; H04W 36/1446
(Continued)

(56) References Cited

U.S. PATENT DOCUMENTS

2013/0005333 A1* 1/2013 Chueh .................. H04W 36/24 455/426.1
2013/0046874 A1 2/2013 Cohn
(Continued)

FOREIGN PATENT DOCUMENTS

EP 3525389 A1 8/2019
WO 2022096125 A1 5/2022
(Continued)

OTHER PUBLICATIONS

International Search Report and Written Opinion for PCT/US24/32006 Mailed Sep. 24, 2024.
(Continued)

*Primary Examiner* — Marcos Batista
(74) *Attorney, Agent, or Firm* — Perilla Knox & Hildebrandt LLP; Jonathan A. Paulis

(57) ABSTRACT

Disclosed are various embodiments for intelligently selecting private radio-based networks or communication service provider (CSP)-operated radio-based networks. In one embodiment, it is determined that a particular application executed in a user equipment (UE) device requests to send data via a wireless network connection. It is determined to switch the wireless network connection in the UE device from a CSP-operated radio-based network to a private radio-based network based at least in part on the particular application or the data to be sent by the particular application. The wireless network connection is switched from the CSP-operated radio-based network to the private radio-based network. The data is sent via the wireless network connection using the private radio-based network.

20 Claims, 16 Drawing Sheets

(58) Field of Classification Search
USPC .................................. 455/436, 437; 370/338
See application file for complete search history.

(56) References Cited

U.S. PATENT DOCUMENTS

| | | | |
|---|---|---|---|
| 2016/0373963 | A1* | 12/2016 | Chechani ............... G05D 1/104 |
| 2017/0171782 | A1* | 6/2017 | Mohamed ........... H04W 36/385 |
| 2018/0041897 | A1 | 2/2018 | Prasad et al. |
| 2018/0184345 | A1* | 6/2018 | Likar ...................... H04L 63/06 |
| 2019/0166506 | A1 | 5/2019 | Ashrafi |
| 2019/0373541 | A1 | 12/2019 | Choi et al. |
| 2020/0008007 | A1 | 1/2020 | Belghoul et al. |
| 2020/0015150 | A1 | 1/2020 | Shamis et al. |
| 2021/0176686 | A1* | 6/2021 | Khalid .................. H04W 36/22 |
| 2021/0185541 | A1* | 6/2021 | Potharaju .............. H04W 24/02 |
| 2021/0306853 | A1 | 9/2021 | Gundavelli et al. |
| 2021/0334769 | A1 | 10/2021 | Kress et al. |
| 2022/0210722 | A1 | 6/2022 | Saini et al. |
| 2022/0263793 | A1 | 8/2022 | Baker et al. |
| 2022/0286926 | A1* | 9/2022 | England ................ H04W 40/36 |
| 2023/0030905 | A1* | 2/2023 | Mao ........................ H04W 8/18 |
| 2023/0164113 | A1 | 5/2023 | Gupta et al. |
| 2023/0171597 | A1 | 6/2023 | Karapantelakis et al. |
| 2024/0121684 | A1 | 4/2024 | Lv et al. |
| 2024/0163162 | A1 | 5/2024 | Gunturu et al. |
| 2024/0163762 | A1 | 5/2024 | Goto |
| 2024/0365116 | A1 | 10/2024 | Lake et al. |
| 2024/0406723 | A1 | 12/2024 | Mueller et al. |
| 2024/0406756 | A1 | 12/2024 | Mueller et al. |
| 2024/0406813 | A1 | 12/2024 | Mueller et al. |
| 2024/0414519 | A1 | 12/2024 | Nearing et al. |
| 2024/0414521 | A1 | 12/2024 | Nearing et al. |
| 2024/0414525 | A1 | 12/2024 | Nearing et al. |
| 2025/0365692 | A1 | 11/2025 | Shimezawa et al. |

FOREIGN PATENT DOCUMENTS

| | | | |
|---|---|---|---|
| WO | 2022208785 | A1 | 10/2022 |
| WO | 2022212241 | A1 | 10/2022 |
| WO | 2023284144 | A1 | 1/2023 |

OTHER PUBLICATIONS

International Search Report and Written Opinion for PCT/US24/33089 mailed Dec. 2, 2024.
Office Action for U.S. Appl. No. 18/326,956 mailed Feb. 23, 2026.
Office Action for U.S. Appl. No. 18/326,933 mailed Dec. 17, 2025.
Office Action for U.S. Appl. No. 18/326,953 mailed Nov. 5, 2025.

* cited by examiner

INTELLIGENTLY SELECTING PRIVATE RADIO-BASED NETWORKS OR PROVIDER-OPERATED RADIO-BASED NETWORKS

BACKGROUND

Fifth-generation New Radio (5G NR) is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ different frequency spectrum. For example, cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
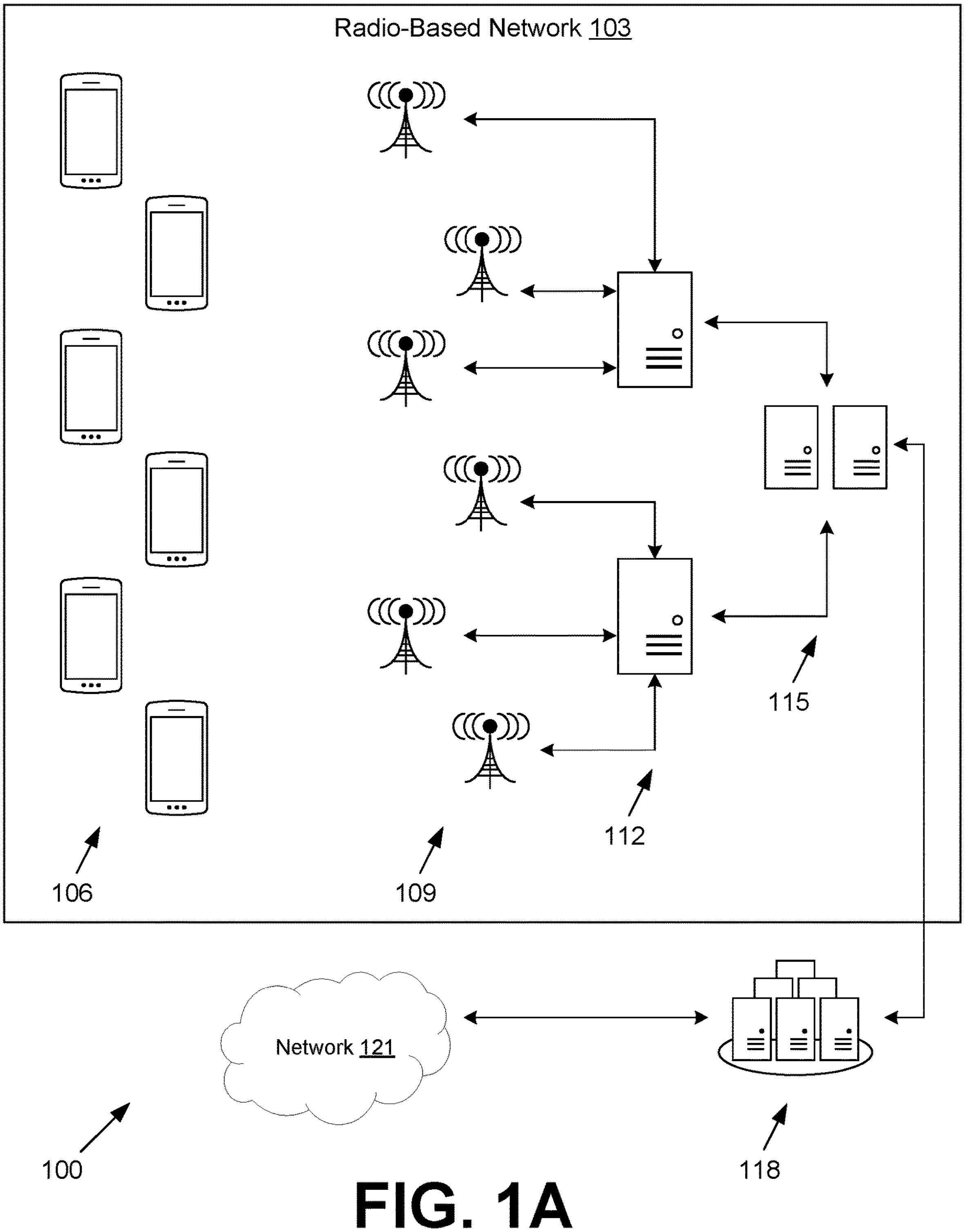
FIG. 1A is a drawing of an example of a communication network that is deployed and managed according to various embodiments of the present disclosure.

The present disclosure relates to using one or more provider-operated radio-based networks alongside existing private network infrastructure. Communication service providers (CSPs) (or mobile network operators (MNOs)) operate radio access networks to cover a geographic area using a cellular topology. A particular geographic area may be served by radio access networks of one or more CSPs, and different geographic areas may be served by different CSPs.

For a variety of reasons, organizations may wish to provision private radio-based networks. For example, a school system may wish to deploy a private radio-based network to cover multiple school campuses, or an enterprise may seek to deploy a private radio-based network to cover one or more warehouse locations. However, build-out of a private radio-based network may be both costly and time consuming. Moreover, the organization's network requirements may change over time, leaving an existing private radio-based network underperforming and in need of an upgrade with additional equipment, or conversely, saddling the organization with unnecessary expenses due to an underutilized and overprovisioned private radio-based network. In addition, the network access needs of an organization may be temporary in an area or subject to a schedule that results in times of little to no network access requirements in the area, but heavy demands for a mission-critical network application at other times. Meanwhile, the area in which the organization seeks radio-based network connectivity may be served by a number of incumbent CSPs. The existing 4G or 5G radio access networks of the CSPs are typically overprovisioned and offer ample capacity for new customers.

Various embodiments of the present disclosure involve provider-operated radio-based networks that are provisioned dynamically on demand leveraging existing radio access network infrastructure of one or more CSPs. As will be described, an organization may create a radio-based network that uses the radio access network of a first CSP in a first area and the radio access network of a second CSP in a second area, or perhaps simultaneously the radio access networks of both CSPs in the same area in order to meet quality-of-service requirements.

The radio-based network may use a core network infrastructure (e.g., operated by a cloud service provider) that is provisioned dynamically and used in conjunction with a plurality of different radio access networks operated by a plurality of CSPs. While the radio-based networks are provisioned on-demand, the radio-based networks may also be scaled up or down or terminated dynamically, thereby providing organizations with the capability to create an ephemeral radio-based network that may exist during a particular time period or periodically according to a schedule. Further, cell sites may be added to or removed from the radio-based network dynamically on demand. In various scenarios, an organization may create either a private radio-based network for internal use only or a radio-based network open to third-party customers using embodiments of the present disclosure.

In a first set of embodiments, approaches are disclosed relating to mobility between CSP-operated radio-based networks and private radio-based networks. In one scenario, a private radio-based network (e.g., a 4G, 5G, or 6G network) may be deployed for one or more sites of an organization using the Citizens Broadband Radio Service (CBRS), television whitespace spectrum, and/or other shared spectrum. However, bandwidth and signal quality of the private radio-based network may be limited to constraints of the shared spectrum. Also, due to movement of the user equipment (UEs), UEs that are authorized to access the private radio-based network may sometimes be operated out-of-range for the private radio-based network. The UEs operated out-of-range for the private radio-based network may be in range for a CSP-operated radio-based network, which use licensed spectrum to widely cover geographic areas with a cellular topology.

The first set of embodiments integrate a private radio-based network with a CSP-operated radio-based network to facilitate seamless transitions between the two networks. In a first scenario, a UE may support two subscriber identity module (SIM) cards simultaneously, one configured to facilitate access to the private radio-based network and another configured to facilitate access to a CSP-operated radio-based network. In a second scenario, a UE may have a single electronic SIM (eSIM) having a first profile for the private radio-based network and a second profile for the CSP-operated radio-based network. In a third scenario, a single SIM may be provisioned in both the private radio-based network and the CSP-operated radio-based network, through a connection of core network functions between the private radio-based network and the CSP-operated radio-based network.

In a second set of embodiments, approaches are disclosed relating to intelligently selecting a CSP-operated radio-based network or a private radio-based network. Where a UE has the capability to connect to either a private radio-based network or a CSP-operated radio-based network, logic on the UE in the form of a client or agent may control selection of the network. In other implementations, logic on a server may select the network and instruct the UE. The intelligent selection may be driven by many factors, such as historical usage data, current network conditions, predicted future network conditions, which applications on the UE are sending data, and so forth.

In a third set of embodiments, approaches are disclosed relating to managing simultaneous use of private wireless local area networks (WLANs) and cellular radio-based networks. Organizations that provision private radio-based networks using cellular technology (e.g., 4G, 5G, 6G) may have existing private WLANs, such as Wi-Fi networks, covering certain areas. The WLANs may offer higher throughput in a more limited coverage area and may be more susceptible to interference and less secure as compared to the cellular networks either using allocated shared spectrum (e.g., CBRS) or licensed spectrum. In some scenarios, the UE may connect simultaneously to both the WLAN and to the cellular radio-based network, using the cellular network as an anchor for a secure and reliable control plane, and the WLAN for a faster data plane. As will be described, eSIM profiles may be used to authorize access to both private WLANs and cellular radio-based networks. Logic implemented on the UE and/or on a server may dynamically direct the UE to connect to the cellular radio-based network or to the WLAN (or even to a wired LAN).

In a fourth set of embodiments, approaches are disclosed relating to automatically integrating provider-operated radio-based networks with existing private networks, such as an existing local area network (LAN) and/or WLAN of an organization. An organization may engage a CSP to provision a private radio-based network for the organization using licensed spectrum, shared spectrum, or a combination of both. Meanwhile, the organization may have an existing on-premises LAN or WLAN to which various computing devices (e.g., servers, user devices, Internet of Things (IoT devices)) are connected. The organization may desire that UEs on the newly provisioned private radio-based network have the ability to connect with resources on the existing on-premises network, or that devices on the existing on-premises network would have the ability to connect with UEs on the private radio-based network.

The fourth set of embodiments introduce one or more application programming interfaces (API) and workflows to automatically integrate these on-premises networks with a provider-operated radio-based network. The organization can specify certain information about its on-premises network (e.g., subnetworks, routers, gateways) via an API, and the API can automatically generate configurations to be applied to enable connectivity between the two networks. For example, the configuration may create a gateway that does network address translation (NAT) and/or an Internet Protocol (IP)v4 to IPv6 gateway on the organization's router. A configuration template may be provided to an administrative user, or in some cases, a workflow may automatically apply the configuration if the appropriate access is authorized. Additionally, in some embodiments, the organization's router may be subsequently automatically reconfigured for maintenance purposes in order to adapt to network changes in the radio-based network.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Historically, enterprises have had to choose between performance and price when evaluating their enterprise connectivity solutions. Cellular networks may offer high performance, great indoor and outdoor coverage and advanced Quality of Service (QOS) connectivity features, but private cellular networks can be expensive and complex to manage. While Ethernet and Wi-Fi require less upfront investment and are easier to manage, enterprises often find that they can be less reliable, require a lot of work to get the best coverage, and do not offer QoS features such as guaranteed bit rate, latency and reliability.

Enterprises can freely deploy various 5G devices and sensors across the enterprise—factory floors, warehouses, lobbies, and communications centers—and manage these devices, enroll users, and assign QoS from a management console. With the disclosed technology, customers can assign constant bit rate throughput to all their devices (such as cameras, sensors, or IoT devices), reliable low latency connection to devices running on factory floors, and broadband connectivity to all handheld devices. The disclosed service can manage all the software needed to deliver connectivity that meets the specified constraints and requirements. This enables an entirely new set of applications that have strict QoS or high IoT device density requirements that traditionally have not been able to run on Wi-Fi networks. Further, the disclosed service can provide application development application programming interfaces (APIs) that expose and manage 5G capabilities like QoS, enabling customers to build applications that can fully utilize the latency and bandwidth capabilities of their network without having to understand the details of the network.

Additionally, the disclosed service can provide a private zone to run local applications within a cloud provider network. This private zone can be connected to and effectively part of a broader regional zone, and allows the customer to manage the private zone using the same APIs and tools as used in the cloud provider network. Like an availability zone, the private zone can be assigned a virtual private network subnet. An API can be used to create and assign subnets to all zones that the customer wishes to use, including the private zone and existing other zones. A management console may offer a simplified process for creating a private zone. Virtual machine instances and containers can be launched in the private zone just as in regional zones. Customers can configure a network gateway to define routes, assign IP addresses, set up network address translation (NAT), and so forth. Automatic scaling can be used to scale the capacity of virtual machine instances or containers as needed in the private zone. The same management and authentication APIs of the cloud provider network can be used within the private zone. In some cases, since cloud services available in the regional zone can be accessed remotely from private zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving the functioning of computer networks by facilitating mobility of a client device between a private radio-based network and a CSP-operated radio-based network through the use of a single SIM card provisioned in both networks, a respective SIM card for each network, or an eSIM with respective profiles for each network; (2) improving the functioning of computer networks by intelligently selecting a private radio-based network or a CSP-operated radio-based network, thereby resulting in improvements in throughput, signal quality, reliability, security, and so on; (3) improving the functioning of cellular radio-based networks by causing data transfers to be offloaded to a WLAN, while maintaining security through the use of the cellular radio-based network as a control plane anchor point; (4) improving security of WLANs by provisioning access credentials based at least in part on eSIM profiles; (5) improving the functioning of computer networks by automatically generating network element configurations to interconnect an existing network with a CSP-operated radio-based network; (6) improving the functioning of computer networks by automatically updating network element configurations in order to maintain an interconnection between an organization network and a CSP-operated radio-based network; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques provide edge location hardware (as described further below) integrated with network functions that run across the entire network, from cell sites to Internet break-outs, and orchestrate the network functions to meet required Quality of Service (QOS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The described "elastic 5G" service provides and manages all of the hardware, software and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1A, shown is an example of a communication network 100 that is deployed and managed according to various embodiments of the present disclosure. The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, or another network that provides wireless network access. The radio-based network 103 may be operated by a cloud service provider for an enterprise, a non-profit, a school system, a governmental entity or other organization. Although referred to as a private network, the radio-based network 103 may use private network addresses or public network addresses in various embodiments.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of client devices 106, which may be mobile devices or fixed location devices. In various examples, the client devices 106 may include smartphones, connected vehicles, IoT devices, sensors, machinery (such as in a manufacturing facility), hotspots, and other devices. The client devices 106 are sometimes referred to as user equipment (UE) or customer premises equipment (CPE).

The radio-based network 103 can include capacity provisioned on one or more radio access networks (RANs) that provide the wireless network access to the plurality of client devices 106 through a plurality of cells 109. The RANs may be operated by different communication service providers. Each of the cells 109 may be equipped with one or more antennas and one or more radio units that send and receive wireless data signals to and from the client devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with client devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e. encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the client devices 106 or the RAN and can handle connection and mobility management tasks. For example, the AMF can manage handovers between base stations in the RAN. In some examples the AMF can be considered as the access point to the 5G core, by terminating certain RAN control plane and client device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances that are configured in turn to execute one or more services that perform the network functions. In one embodiment, the distributed computing devices 112 are ruggedized machines that are deployed at each cell site.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks.

Figure 1B:
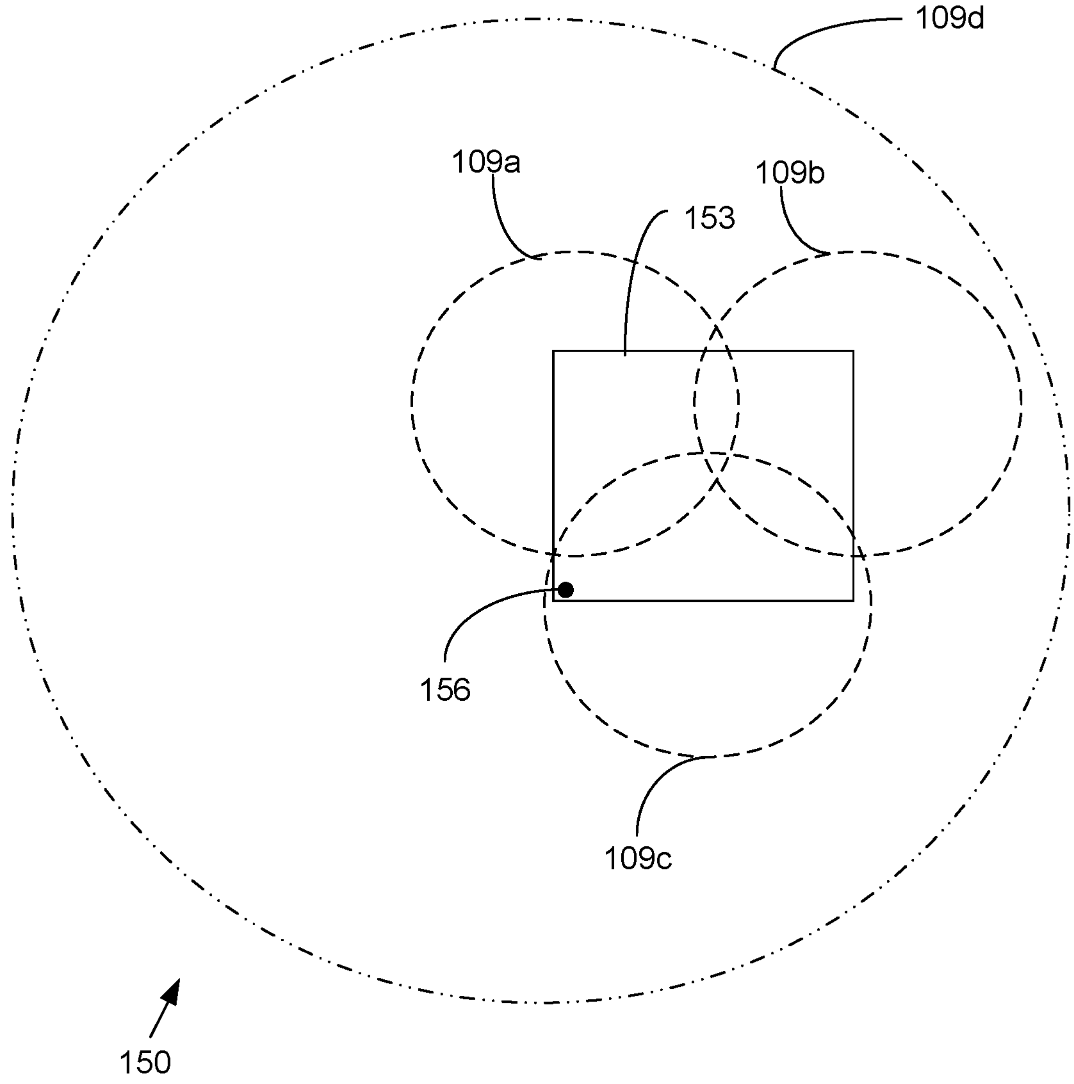
FIG. 1B is an example of a coverage map showing coverage of cells of a private radio-based network and a representative cell of a communication service provider (CSP)-operated radio-based network according to one or more embodiments in accordance with various embodiments of the present disclosure.

Moving on to FIG. 1B, shown is an example of a coverage map 150 showing coverage of cells 109*a*, 109*b*, 109*c* of a private radio-based network 103 and a representative cell 109*d* of a CSP-operated radio-based network 103 according to one or more embodiments. The private radio-based network 103 has been deployed in this example to cover premises 153 of an organization. The private radio-based network 103 may, for example, utilize shared or allocated spectrum, such as CBRS, television whitespace, and so on. The cells 109*a*, 109*b*, and 109*c* are arranged in order to provide coverage over the entire premises 153. However, some locations in the premises 153 may receive weaker signals from a respective cell 109, and/or a respective cell 109 may be subject to a relatively higher device load or utilization, leading to potentially diminished performance.

Separately from the private radio-based network 103, a CSP-operated radio-based network 103 may provide overlapping coverage over the premises 153 and beyond. The CSP-operated radio-based network 103 may be operated by a CSP such as telecommunication service provider with licensed spectrum. In some cases, the CSP may operate the RAN portion of the CSP-operated radio-based network 103, with a core network at least partly implemented by a cloud provider network. In some cases, the core network of the private radio-based network 103 may also be at least partly implemented by the cloud provider network. Devices 106 (FIG. 1A) may be authorized to access both the CSP-operated radio-based network 103 and the private radio-based network 103, and devices 106 may be configured with the ability to switch between the CSP-operated radio-based network 103 and the private radio-based network 103.

For example, a device 106 at a location 156 may receive only a marginal signal from the cell 109*c* of the private radio-based network 103, and despite being on the premises 153, the device 106 may be configured to switch to the cell 109*d* in order to receive a better signal (e.g., with a higher signal-to-noise ratio) as compared to the cell 109*c*. In other examples, the cell 109*c* may be overutilized compared to the cell 109*d*, or the cell 109*d* may provide higher bandwidth or QoS. The relative network conditions may be assessed based upon current metrics and/or predicted from historical network condition data. If the device 106 is following a predictable trajectory, it may be predicted that the device 106 may leave the cell 109*c* coverage area. In such a case, the device 106 may be predictively switched from the cell 109*c* to the cell 109*d*.

In other scenarios, whether the device 106 uses the CSP-operated radio-based network 103 or the private radio-based network 103 may depend on a classification of the device 106, a particular application on the device 106 that is sending/receiving data, a classification of the data being sent/received, and other characteristics. For example, a device 106 may be forced to switch to the private radio-based network 103 when it is in range or when the device 106 crosses a geofence (e.g., a perimeter of the premises 153), or when the particular application used (or the data transferred) is of a high priority or is sensitive from a security standpoint. Also, edge computing resources hosted in the private radio-based network 103 may be accessed with lower latency through the private radio-based network 103 than through the CSP-operated radio-based network 103, even if the CSP-operated radio-based network offers more bandwidth or has a stronger signal.

Figure 1C:
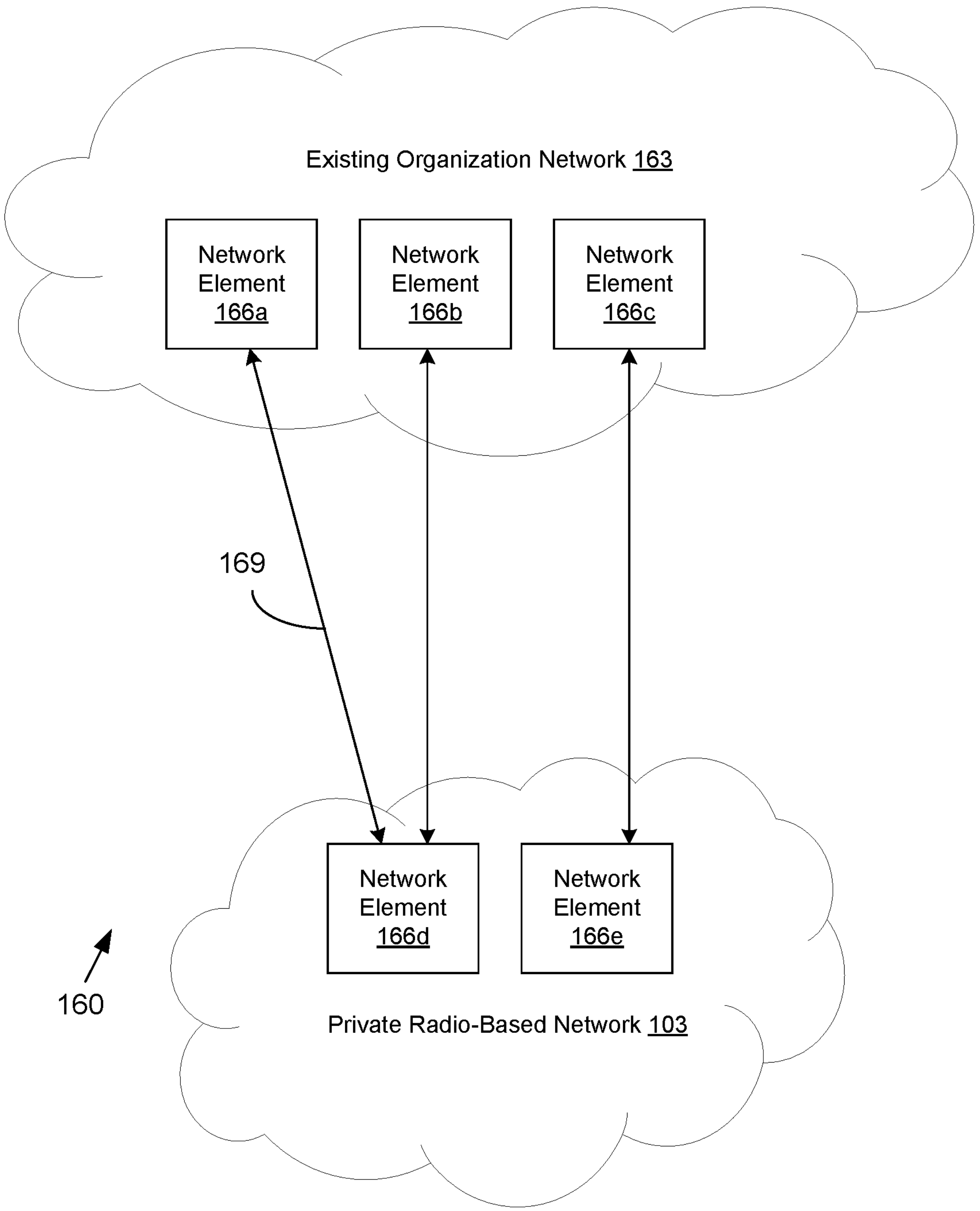
FIG. 1C is an example integration scenario between an existing organization network and a private radio-based network in accordance with various embodiments of the present disclosure.

Turning now to FIG. 1C, shown is an example integration scenario 160 between an existing organization network 163 and a private radio-based network 103 according to one or more embodiments. The existing organization network 163 may comprise one or more wired local area networks (LANs), one or more wired wide area networks (WANs), one or more wireless local area networks (WLANs), and so forth. In this non-limiting example, the existing organization network 163 may have network elements 166*a*, 166*b*, 166*c* as points of interconnection, while the private radio-based network 103 may have network elements 166*d*, 166*e* as points of interconnection. The network elements 166 may correspond, for example, to routers, gateways, firewalls, which may be points of entry to or exit from the respective network. Although one existing organization network 163 is shown in FIG. 1C, it is understood that the existing organization network 163 may comprise multiple networks, e.g., corresponding to different locations of the organization.

As will be described, based on receiving a specification of the network elements 166 of the existing organization network 163 (e.g., via a user interface or API), a workflow may be performed in order to facilitate integration of the existing organization network 163 with a private radio-based network 103 of the organization, where the private radio-based network 103 may be operated by a CSP, a cloud service provider, and/or other entities on behalf of the organization. The information about the existing organization network 163 may be analyzed and configurations for the network elements 166*a*, 166*b*, 166*c* may be generated to facilitate interconnection with the network elements 166*d*, 166*e* of the private radio-based network 103. The configurations may be automatically applied to the network elements 166 and may be updated in the future automatically based upon changes in the private radio-based network 103.

The configurations enable network traffic, or selected network traffic, to flow along data links 169 between the existing organization network 163 and the private radio-based network 103. The data links 169 may comprise connections through the public Internet, private optical links, point-to-point microwave links, wireless LTE or 5G links, and so on. In some cases, the data links 169 may utilize the networking infrastructure of a cloud provider network, when the existing organization network 163 and the private radio-based network 103 are both provisioned with network connections to the cloud provider network. The data links 169 may be provisioned in some cases automatically according to a workflow involved in establishing the interconnection between the existing organization network 163 and the private radio-based network 103. Where there are multiple networks at different locations in the existing organization network 163, a respective data link 169 may be provisioned at each location to interconnect the private radio-based network 103. In some cases, a separate private radio-based network 103 may be provisioned at each distinct location of the existing organization network 163.

Figure 2A:
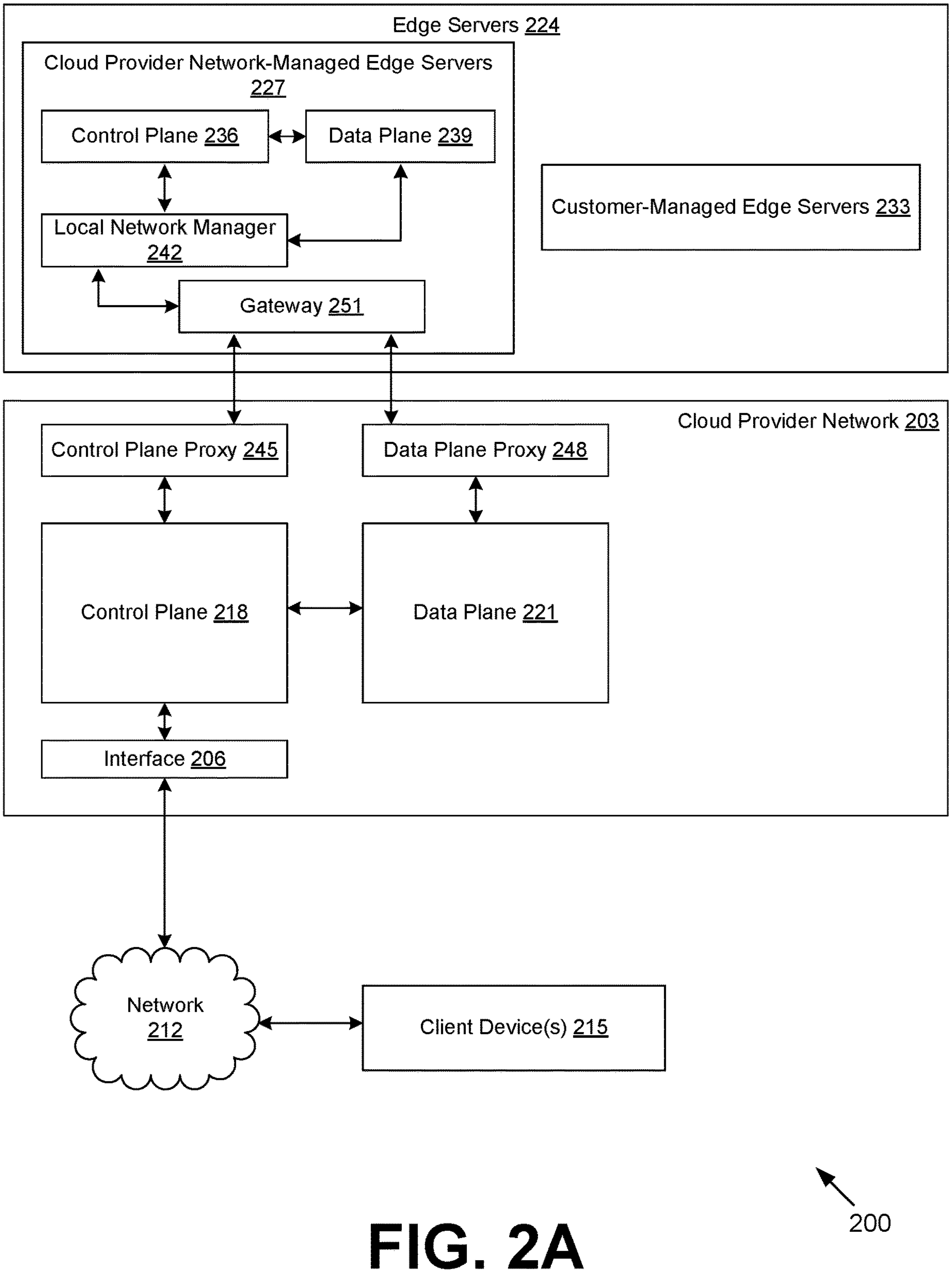
FIG. 2A illustrates an example of a networked environment including a cloud provider network and further including various edge servers of the cloud provider network, which may be used in various locations within the communication network of FIG. 1A, according to some embodiments of the present disclosure.

FIG. 2A illustrates an example of a networked environment 200 including a cloud provider network 203 and further including various edge servers of the cloud provider network 203, which may be used in combination with on-premise customer deployments within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 203 can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 gigabyte (GB) to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge server 224 provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, an edge server 224 can be configured to provide capacity for cloud-based workloads to run within the telecommunications network. In some implementations, an edge server 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such edge servers 224 can include cloud provider network-managed edge servers 227 (e.g., formed by servers located in a cloud provider-managed facility separate from those associated with the cloud provider network 203), customer-managed edge servers 233 (e.g., formed by servers located on-premise in a customer or partner facility), among other possible types of edge servers 224. In some embodiments, a customer-managed edge server 233 may be directly connected to the network 212, such as a customer-operated network, thereby bypassing a connection through the cloud provider network 203.

As illustrated in the example edge server 224, an edge server 224 can similarly include a logical separation between a control plane 236 and a data plane 239, respectively extending the control plane 218 and data plane 221 of the cloud provider network 203. In some embodiments, the edge server 224, such as the customer-managed edge server 233, may have no control plane 236 or a minimal control plane 236. The edge server 224 may be configured, e.g., by the cloud provider network operator, with an appropriate combination of hardware with software and/or firmware elements to support various types of computing-related resources, and to do so in a manner that mirrors the experience of using the cloud provider network 203. For example, one or more edge server location servers can be provisioned by the cloud provider for deployment within an edge server 224. As described above, the cloud provider network 203 may offer a set of predefined instance types, each having varying types and quantities of underlying hardware resources. Each instance type may also be offered in various sizes. In order to enable customers to continue using the same instance types and sizes in an edge server 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the edge server location servers. This can improve utilization of computing resources within the edge location by allowing for better packing of running instances on servers, and also provides a seamless experience regarding instance usage across the cloud provider network 203 and the cloud provider network-managed edge server 227.

The edge server 224 can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at an edge server 224 than in the region, an optimal utilization experience may not be provided if the edge server 224 includes such dedicated block store servers. Accordingly, a block storage service may be virtualized in the edge server 224, such that one of the VMs runs the block store software and stores the data of a volume. Similar to the operation of a block storage service in the region of a cloud provider network 203, the volumes within an edge server 224 may be replicated for durability and availability. The volumes may be provisioned within their own isolated virtual network within the edge server 224. The compute instances and any volumes collectively make up a data plane 239 extension of the provider network data plane 221 within the edge server 224.

The servers within an edge server 224 may, in some implementations, host certain local control plane components, for example, components that enable the edge server 224 to continue functioning if there is a break in the connection back to the cloud provider network 203. Examples of these components include a migration manager that can move compute instances between edge servers 224 if needed to maintain availability, and a key value data store that indicates where volume replicas are located. However, generally the control plane 236 functionality for an edge server 224 will remain in the cloud provider network 203 in order to allow customers to use as much resource capacity of the edge server 224 as possible.

The migration manager may have a centralized coordination component that runs in the region, as well as local controllers that run on the edge servers 224 (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine or application between different physical machines without significantly disrupting the availability of the virtual machine (e.g., the down time of the virtual machine is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at an edge server 224 may be designed by the cloud provider to run on the cloud provider substrate network, and this software may be enabled to run unmodified in an edge server 224 by using local network manager(s) 242 to create a private replica of the substrate network within the edge location (a "shadow substrate"). The local network manager(s) 242 can run on edge server 224 servers and bridge the shadow substrate with the edge server 224 network, for example, by acting as a virtual private network (VPN) endpoint or endpoints between the edge server 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the edge server 224 to seamlessly communicate with resources in the cloud provider network 203. In some implementations, a single local network manager 242 can perform these actions for all servers hosting compute instances in an edge server 224. In other implementations, each of the server hosting compute instances may have a dedicated local network manager 242. In multi-rack edge locations, inter-rack communications can go through the local network managers 242, with local network managers maintaining open tunnels to one another.

Edge server locations can utilize secure networking tunnels through the edge server 224 network to the cloud provider network 203, for example, to maintain security of customer data when traversing the edge server 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in an edge server 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between an edge server 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of edge server 224. That is, CP proxies 245 provide infrastructure for tunneling management API traffic destined for edge server out of the region substrate and to the edge server 224. For example, a virtualized computing service of the cloud provider network 203 can issue a command to a VMM of an edge server 224 to launch a compute instance. A CP proxy 245 maintains a tunnel (e.g., a VPN) to a local network manager 242 of the edge server 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one for VMs at an edge server 224 or may be able to manage control plane traffic for multiple VMs.

A data plane (DP) proxy 248 can also be provisioned in the cloud provider network 203 to represent particular VMs in an edge server 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span edge servers 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the edge server(s) and the cloud provider network 203. Data plane traffic flowing between an edge server 224 and the cloud provider network 203 can be passed through DP proxies 248 associated with that edge server 224. For data plane traffic flowing from an edge server 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to an edge server 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using edge server resources in a manner analogous to the way in which such commands would be issued with respect to compute instances hosted within the cloud provider network 203. From the perspective of the customer, the customer can now seamlessly use local resources within an edge server 224 (as well as resources located in the cloud provider network 203, if desired). The compute instances set up on a server at an edge server 224 may communicate both with electronic devices located in the same network, as well as with other resources that are set up in the cloud provider network 203, as desired. A local gateway 251 can be implemented to provide network connectivity between an edge server 224 and a local network (e.g., a network of the customer).

There may be circumstances that necessitate the transfer of data between the object storage service and an edge server 224. For example, the object storage service may store machine images used to launch VMs, as well as snapshots representing point-in-time backups of volumes. The object gateway can be provided on an edge server or a specialized storage device, and provide customers with configurable, per-bucket caching of object storage bucket contents in their edge server 224 to minimize the impact of edge server-region latency on the customer's workloads. The object gateway can also temporarily store snapshot data from snapshots of volumes in the edge server 224 and then sync with the object servers in the region when possible. The object gateway can also store machine images that the customer designates for use within the edge server 224 or on the customer's premises. In some implementations, the data within the edge server 224 may be encrypted with a unique key, and the cloud provider can limit keys from being shared from the region to the edge server 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge server bucket can be created (on the object store servers) to store snapshot data and machine image data using the edge server encryption key.

In the manner described above, an edge server 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones," "edge zones," or "distributed cloud edge zones" (due to being near to customer workloads at the "edge" of the network). An edge zone may be connected in various ways to a publicly accessible network such as the Internet, for example directly, via another network, or via a private connection to a region. Although typically an edge zone would have more limited capacity than a region, in some cases an edge zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1, the distributed computing devices 112 (FIG. 1), the centralized computing devices 115 (FIG. 1), and the core computing devices 118 (FIG. 1) may be implemented as edge servers 224 of the cloud provider network 203. The installation or siting of edge servers 224 within a communication network 100 can vary subject to the particular network topology or architecture of the communication network 100. Edge servers 224 can generally be connected anywhere the communication network 100 can break out packet-based traffic (e.g., IP based traffic). Additionally, communications between a given edge server 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between an edge server 224 and the cloud provider network 203 can be broken out of the communication network 100 without routing through the core network.

In some embodiments, edge servers 224 can be connected to more than one communication network associated with respective customers. For example, when two communication networks of respective customers share or route traffic through a common point, an edge server 224 can be connected to both networks. For example, each customer can assign some portion of its network address space to the edge server 224, and the edge server 224 can include a router or gateway 251 that can distinguish traffic exchanged with each of the communication networks 100. For example, traffic destined for the edge server 224 from one network might have a different destination IP address, source IP address, and/or virtual local area network (VLAN) tag than traffic received from another network. Traffic originating from the edge server 224 to a destination on one of the networks can be similarly encapsulated to have the appropriate VLAN tag, source IP address (e.g., from the pool allocated to the edge server 224 from the destination network address space) and destination IP address.

Figure 2B:
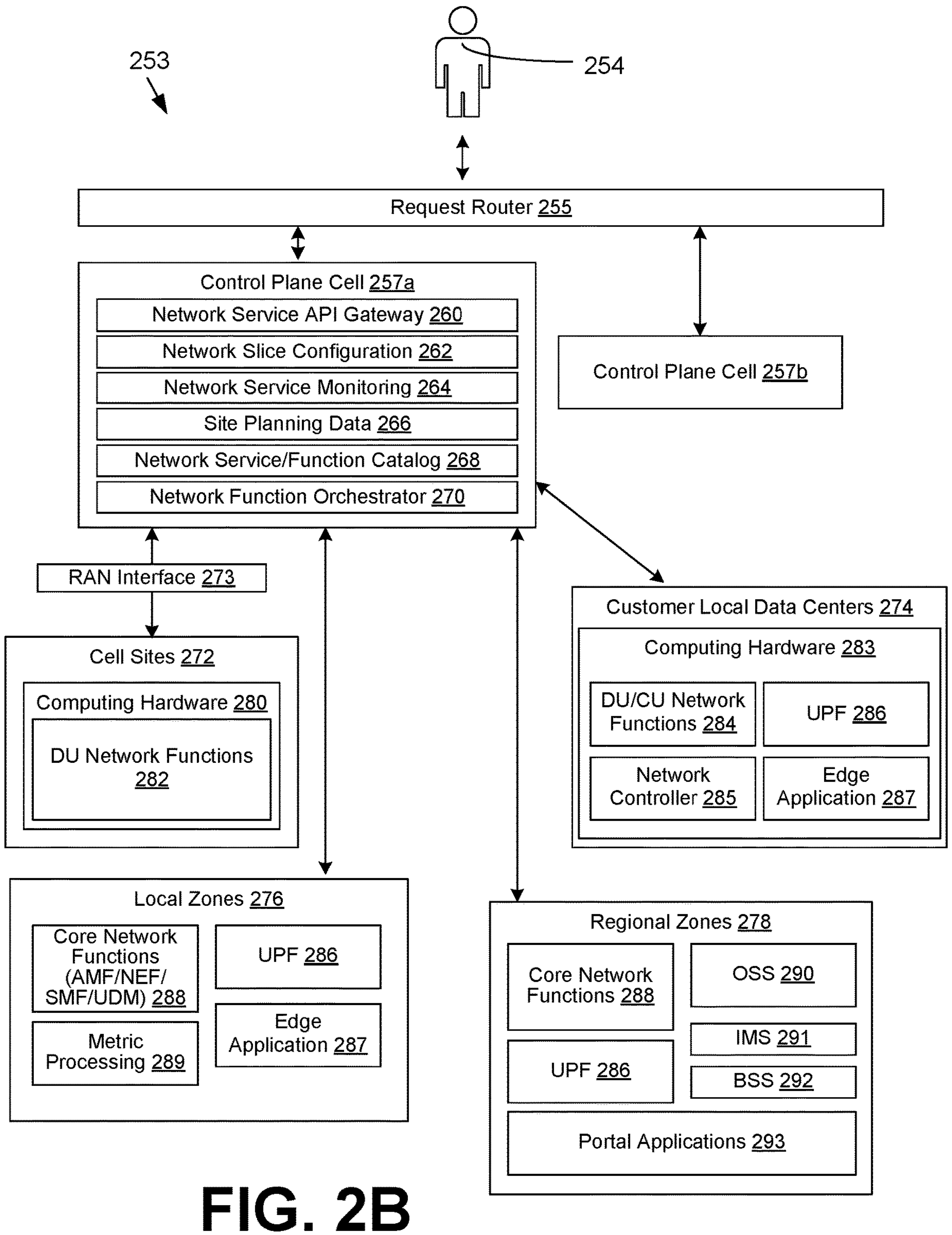
FIG. 2B depicts an example of cellularization and geographic distribution of the communication network of FIG. 1A.

FIG. 2B depicts an example 253 of cellularization and geographic distribution of the communication network 100 (FIG. 1). In FIG. 2B, a user device 254 communicates with a request router 255 to route a request to one of a plurality of control plane cells 257*a* and 257*b*. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the Network Function (NF) Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 282. The customer local data centers 274 include computing hardware 283 that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
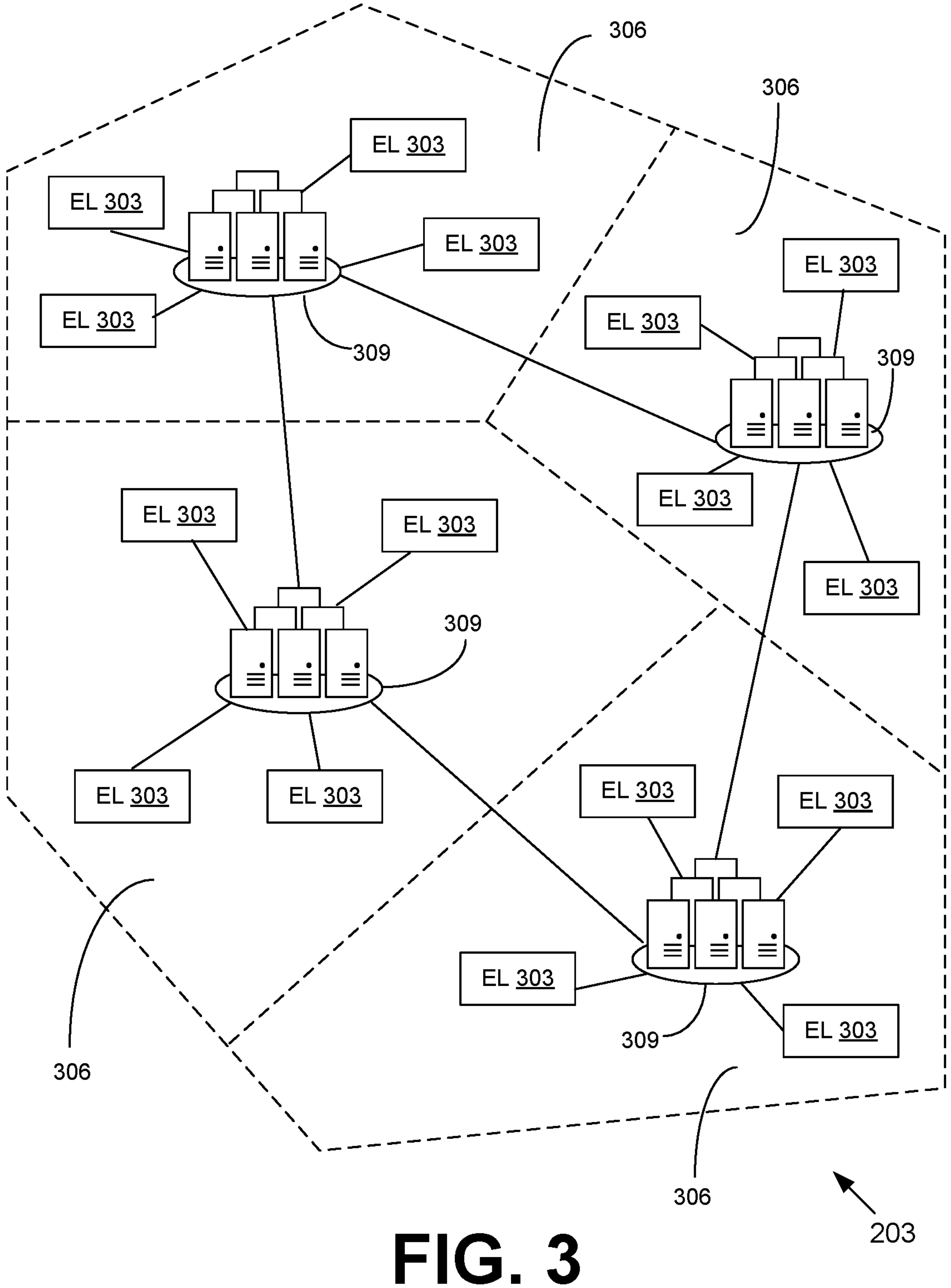
FIG. 3 illustrates an example of the networked environment of FIG. 2A including geographically dispersed edge servers according to some embodiments of the present disclosure.

FIG. 3 illustrates an exemplary cloud provider network 203 including geographically dispersed edge servers 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1), in some cases, such as when a cloud provider network facility is relatively close to a communications service provider facility, the edge location 303 can remain within the physical premises of the cloud provider network 203 while being connected to the communications service provider network via a fiber or other network link.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
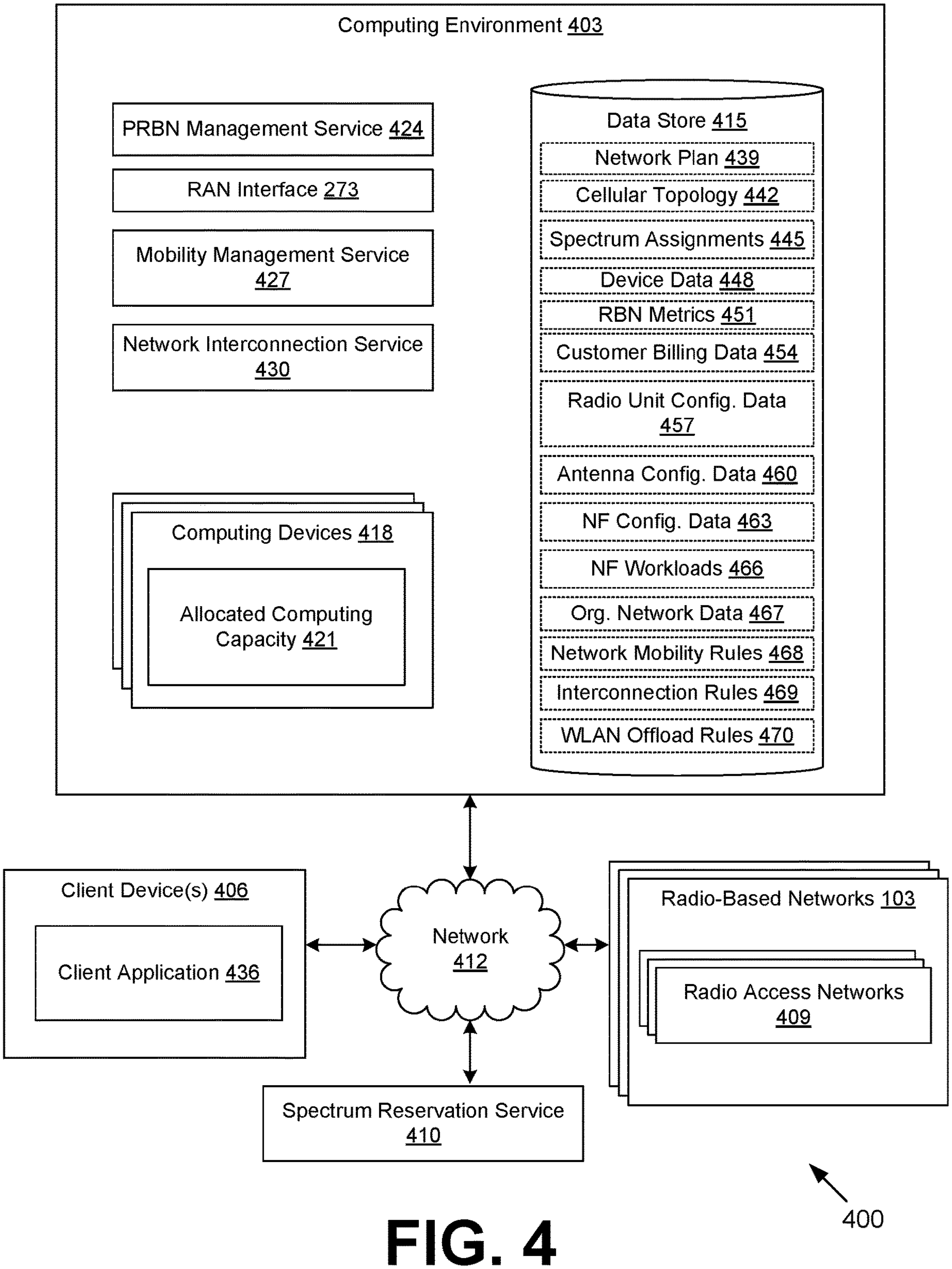
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, one or more radio-based networks 103 including one or more radio access networks (RANs) 409, and a spectrum reservation service 410, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The RANs 409 may be operated by a plurality of different communication service providers. In some cases, one or more of the RANs 409 may be operated by a cloud provider network 203 (FIG. 2A) or a customer of the cloud provider network 203.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, Advanced Reduced Instruction Set Computer (RISC) Machines (ARM), Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include a private radio-based network (PRBN) management service 424, a capacity management service 433, a RAN interface 273, a mobility management service 427, a network interconnection service 430, and other applications, services, processes, systems, engines, or functionality not discussed in detail herein.

The PRBN management service 424 is executed to provision, manage, configure, and monitor radio-based networks 103 (FIG. 1A) that are operated by a cloud service provider and/or a CSP on behalf of customers. To this end, the PRBN management service 424 may generate a number of user interfaces that allow customers to place orders for new private radio-based networks 103, scale up or scale down existing radio-based networks 103, modify the operation of existing private radio-based networks 103, configure client devices 106 (FIG. 1A) that are permitted to use the private radio-based networks 103, provide statistics and metrics regarding the operation of private radio-based networks 103, reserve frequency spectrum for customer's networks via a spectrum reservation service 410, provision or release capacity in RANs 409 via the RAN interface 273, and so on. For example, the PRBN management service 424 may generate one or more network pages, such as web pages, that include the user interfaces. Also, the PRBN management service 424 may support this functionality by way of an API that may be called by a client application 436. In addition to facilitating interaction with users, the PRBN management service 424 also implements orchestration of deployments and configuration changes for the private radio-based networks 103 and on-going monitoring of performance parameters. In some cases, the PRBN management service 424 may generate a network plan 439 for a customer based at least in part in a specification of the customer's location, an automated site survey by an unmanned aerial vehicle, and/or other input parameters.

The mobility management service 427 is executed to facilitate and/or control the mobility of devices 106 between a private radio-based network 103 and a CSP-operated radio-based network 103, and/or a radio-based network 103 and a WLAN. In some embodiments, the mobility management service 427 may process various data parameters about a device 106 and the networks and intelligently select a particular network on behalf of the device 106. For example, based on a combination of various factors, the mobility management service 427 may cause a device 106 to switch from a private radio-based network 103 to a CSP-operated radio-based network 103 and vice versa, or to utilize a WLAN network (or wired network) for data transfers instead of a radio-based network 103 operated according to a cellular standard. In some examples, portions of the mobility management service 427 may be implemented in the device 106 instead of the computing environment 403. In various embodiments, the mobility management service 427 may be executed in the cloud provider network 203, may be provided to the client device 106 to be executed locally in the client device 106, or the functionality may be divided among both the cloud provider network 203 and the client device 106.

The network interconnection service 430 is executed to facilitate integration and/or interconnection between an existing organization network 163 (FIG. 1C) and a private radio-based network 103 being provisioned for the organization. The network interconnection service 430 may receive network topology data and/or other data via an interface and then launch workflows to generate configurations for network elements 166 in the existing organization network 163. In some embodiments, the network interconnection service 430 may cause the configurations to be automatically deployed to the network elements 166 in the existing organization network 163. In some embodiments, the network interconnection service 430 may update configurations for network elements 166 over time as the private radio-based network 103 is modified in order to maintain the interconnection. In some embodiments, the network interconnection service 430 automatically provisions the data links 169 (FIG. 1B) between the existing organization network 163 and the private radio-based network 103.

The data stored in the data store 415 includes, for example, one or more network plans 439, one or more cellular topologies 442, one or more spectrum assignments 445, device data 448, one or more RBN metrics 451, customer billing data 454, radio unit configuration data 457, antenna configuration data 460, network function configuration data 463, one or more network function workloads 466, organization network data 467, one or more network mobility rules 468, one or more interconnection rules 469, one or more WLAN offload rules 470, and potentially other data.

The network plan 439 is a specification of a radio-based network 103 to be deployed for a customer. For example, a network plan 439 may include premises locations or geographic areas to be covered, a number of cells, device identification information and permissions, a desired maximum network latency, a desired bandwidth or network throughput for one or more classes of devices, one or more quality of service parameters for applications or services, one or more routes to be covered by the RBN 103, a schedule of coverage for the RBN 103 or for portions of the RBN 103, a periodic schedule of coverage for the RBN 103 or for portions of the RBN 103, a start time for the RBN 103 or for portions of the RBN 103, an end time for the RBN 103 or for portions of the RBN 103, and/or other parameters that can be used to create a radio-based network 103. A customer may manually specify one or more of these parameters via a user interface. One or more of the parameters may be prepopulated as default parameters. In some cases, a network plan 439 may be generated for a customer based at least in part on automated site surveys using unmanned aerial vehicles. Values of the parameters that define the network plan 439 may be used as a basis for a cloud service provider billing the customer under a utility computing model. For example, the customer may be billed a higher amount for lower latency targets and/or higher bandwidth targets in a service-level agreement (SLA), and the customer can be charged on a per-device basis, a per-cell basis, based on a geographic area served, based on spectrum availability, etc. In some cases, the network plan 439 may incorporate thresholds and reference parameters determined at least in part on an automated probe of an existing private network of a customer.

The cellular topology 442 includes an arrangement of a plurality of cells for a customer that takes into account reuse of frequency spectrum where possible given the location of the cells. The cellular topology 442 may be automatically generated given a site survey. In some cases, the number of cells in the cellular topology 442 may be automatically determined based on a desired geographic area to be covered, availability of backhaul connectivity at various sites, signal propagation, available frequency spectrum, and/or on other parameters. For radio-based networks 103, the cellular topology 442 may be developed to cover one or more buildings in an organizational campus, one or more schools in a school district, one or more buildings in a university or university system, and other areas.

The spectrum assignments 445 include frequency spectrum that is available to be allocated for radio-based networks 103 as well as frequency spectrum that is currently allocated to radio-based networks 103. The frequency spectrum may include spectrum that is publicly accessible without restriction, spectrum that is individually owned or leased by customers, spectrum that is owned or leased by the provider, spectrum that is free to use but requires reservation, and so on.

The device data 448 corresponds to data describing client devices 106 that are permitted to connect to the radio-based network 103. This device data 448 includes corresponding users, account information, billing information, data plans, permitted applications or uses, an indication of whether the client device 106 is mobile or fixed, a location and location history, a trajectory, a velocity, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on. The device data 448 may include SIM profiles and/or eSIM profiles that authorize a device 106 to connect to a private radio-based network 103, a CSP-operated radio-based network 103, a WLAN, or other radio-based networks 103.

The RBN metrics 451 include various metrics or statistics that indicate the performance or health of the radio-based network 103. Such RBN metrics 451 may include bandwidth metrics, utilization metrics, dropped packet metrics, signal strength metrics, latency metrics, and so on. The RBN metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The radio unit configuration data 457 may correspond to configuration settings for radio units deployed in radio-based networks 103. Such settings may include frequencies to be used, protocols to be used, modulation parameters, bandwidth, network routing and/or backhaul configuration, and so on.

The antenna configuration data 460 may correspond to configuration settings for antennas, to include frequencies to be used, azimuth, vertical or horizontal orientation, beam tilt, and/or other parameters that may be controlled automatically (e.g., by network-connected motors and controls on the antennas) or manually by directing a user to mount the antenna in a certain way or make a physical change to the antenna.

The network function configuration data 463 corresponds to configuration settings that configure the operation of various network functions for the radio-based network 103. In various embodiments, the network functions may be deployed in VM instances or containers located in computing devices 418 that are at cell sites, at customer aggregation sites, or in data centers remotely located from the customer. Non-limiting examples of network functions may include an access and mobility management function, a session management function, a user plane function, a policy control function, an authentication server function, a unified data management function, an application function, a network exposure function, a network function repository, a network slice selection function, and/or others. The network function workloads 466 correspond to machine images, containers, or functions to be launched in the allocated computing capacity 421 to perform one or more of the network functions.

The organization network data 467 includes network topology information and/or other information regarding an existing organization network 163. For example, the organization network data 467 may describe the network elements 166 (e.g., routers, gateways, firewalls) that represent the interconnection or touch points for the existing organization network 163. The information may include security credentials, existing configurations, device identifiers, device model numbers, and so on. In some cases, the organization network data 467 may define classifications of data that are allowed or disallowed to be transferred between the existing organization network 163 and the private radio-based network 103.

The network mobility rules 468 are used to enable mobility between a private radio-based network 103 and a CSP-operated radio-based network 103. For example, the network mobility rules 468 may define parameters that control an intelligent selection between the private radio-based network 103 and the CSP-operated radio-based network 103.

The interconnection rules 469 are used to generate network element configurations to facilitate interconnections between a private radio-based network 103 and an existing organization network 163. The generation of configurations may depend on the type of network element 166, including, e.g., the vendor, the model, etc.

The WLAN offload rules 470 may control when to initiate offloading of data transfers from a radio-based network 103 to a WLAN, while the radio-based network 103 remains as the control plane anchor point.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

In some embodiments, the spectrum reservation service 410 provides reservations of frequency spectrum for customers' use in RANs 409. In one scenario, the spectrum reservation service 410 is operated by an entity, such as a third party, to manage reservations and coexistence in publicly accessible spectrum. One example of such spectrum may be the Citizens Broadband Radio Service (CBRS). In another scenario, the spectrum reservation service 410 is operated by a telecommunications service provider in order to sell or sublicense portions of spectrum owned or licensed by the provider.

Figure 5A:
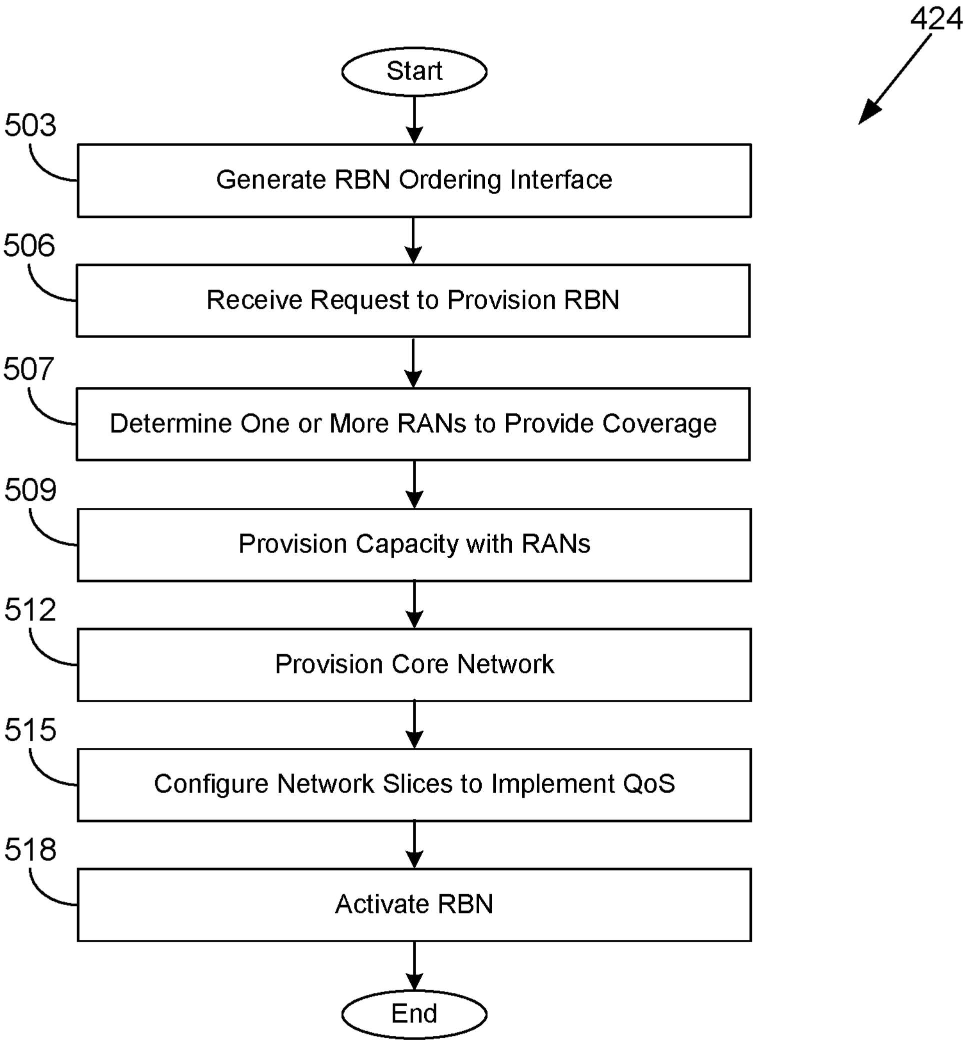
FIGS. 5A and 5B are flowcharts illustrating examples of functionality implemented as portions of a private radio-based network management service executed in a computing environment in the networked environment of FIG. 4 according to various embodiments of the present disclosure.

Referring next to FIG. 5A, shown is a flowchart that provides one example of the operation of a portion of the PRBN management service 424 according to various embodiments. It is understood that the flowchart of FIG. 5A provides merely an example of the many different types of functional arrangements that may be employed to implement the operation of the portion of the PRBN management service 424 as described herein. As an alternative, the flowchart of FIG. 5A may be viewed as depicting an example of elements of a method implemented in the computing environment 403 (FIG. 4) according to one or more embodiments.

Beginning with box 503, the PRBN management service 424 generates a user interface for ordering or provisioning an RBN 103 (FIG. 1A). For example, the user interface may include components for specifying a network plan 439 (FIG. 4) or parameters for a network plan 439. Such parameters may include, for example, a number of cells, a map or site plan of the customer's premises or geographic area to be covered, a target bandwidth, information about client devices 106 (FIG. 1A) or users, a target minimum latency, a desired cost, a schedule of coverage (including start and end times, or periods of coverage in one or more areas or portions of areas), one or more routes to be covered, and/or other parameters. The user interface may also facilitate specifying a list of user equipment (UE) identifiers that are permitted to connect to the RBN 103. The user interface may include components for uploading one or more data files that include this information. The user interface may be sent as a network page or other network data over the network 412 (FIG. 4) for rendering by a client application 436 (FIG. 4) executed in a client device 406 (FIG. 4). Alternatively, a client application 436 may make one or more API calls in order to place an order for or to provision an RBN 103 from a provider.

In box 506, the PRBN management service 424 receives a request to provision an RBN 103 from an organization. For example, a user may submit a form or otherwise interact with a user interface to cause a request to be submitted. Alternatively, the client application 436 may make one or more API calls in order to request to provision the RBN 103.

In box 507, the PRBN management service 424 may determine one or more RANs 409 (FIG. 4) to provide coverage in the specified areas or routes according to the time periods of desired coverage (or indefinitely, as the case may be). The RANs 409 may be operated by a plurality of different communication service providers. To this end, the PRBN management service 424 may communicate with systems associated with the RANs 409 using the RAN interface 273 (FIG. 4) in order to determine coverage availability in an area, pricing, QoS availability, and so on. In various scenarios, one or more of the RANs 409 may be operated by the cloud provider network 203 or a customer of the cloud provider network 203, which may translate into lower cost of usage as compared to RANs 409 operated by third-party communication service providers. The PRBN management service 424 may be configured to prefer using such RANs 409 of the cloud provider network 203 or of the customer when such RANs 409 are available and can provide the requested QoS. In some cases, there may be a single RAN 409 that is able to provide coverage over the entire area. In other cases, the use of multiple RANs 409 may be necessary to cover the entire area.

When multiple RANs 409 are available, the PRBN management service 424 may determine the RAN 409 or RANs 409 to be used based upon factors such as cost, QoS, and so forth. It is noted that in some situations, cost may dominate QoS as a factor for RAN 409 selection. For example, high latency and low bandwidth network connectivity may be acceptable for IoT device telemetry, and a RAN 409 having coverage with those characteristics may be selected when the offering is at a low cost. It is noted the cost for using a RAN 409 may depend on the location, as well as the historical demand or a current demand seen by the RAN 409 at the location. RANs 409 with higher demand may be avoided by the PRBN management service 424 as the higher demand may be associated with lower QoS. Where cost is a factor, the resulting RBN 103 may be created differently than what would most optimally cover an area or would most optimally meet the requested QoS. In some cases, when multiple RANs 409 are available, the PRBN management service 424 may reserve capacity from two or more RANs 409 in order to enhance coverage or provide greater QoS or reliability, particularly when user devices are able to connect with multiple RANs 409 simultaneously to increase throughput.

In box 509, the PRBN management service 424 provisions the desired capacity with the RAN(s) 409 that have been determined in box 507. In some embodiments, the capacity may be reserved on a per-cell-site basis, for specified times or indefinitely. For example, where capacity is reserved for a route, capacity may be received at each cell site along the route at times at which user devices are predicted to be present along the route. The capacity may be released according to a schedule when the capacity is no longer necessary. Specific network slices may be provisioned within the RAN(s) 409 in order to meet QoS requirements. To provision the desired capacity, the PRBN management service 424 may communicate with systems of the RANs 409 via the RAN interface 273.

In box 512, the PRBN management service 424 provisions a core network for the RBN 103. In this regard, the PRBN management service 424 allocates or instantiates a number of network functions for the RBN 103. Examples of such network functions are described in connection with FIG. 2B and can include a UPF 286 (FIG. 2B), core network functions 288 (AMF, NEF, SMF, and UDM) (FIG. 2B), DU/CU network functions 284 (FIG. 2B), and so on. In one embodiment, all of the network functions of the core network are provisioned in allocated computing capacity 421 (FIG. 4) that is part of a cloud provider network 203 (FIG. 2A). In some embodiments, some or all of the network functions are provisioned within cloud provider network-managed edge servers 227 (FIG. 2A).

In provisioning the core network, the PRBN management service 424 may cause customer workloads to be transitioned off of computing devices 418 (FIG. 4) or cloud provider network-managed edge servers 227 to provide capacity for the network function workloads 466 (FIG. 4). The network function workloads 466 may be assigned to computing devices 418 at locations in the cloud provider network 203 that are proximate to an area or location to be covered by the RBN 103, or proximate to an interconnection point for the RANs 409 that are used to provide radio coverage. The locations of the network function workloads 466 may be selected to minimize latency or to otherwise meet QoS parameters specified for the RBN 103.

In some cases, network function workloads 466 may be already instantiated within a cloud provider network 203 but currently unallocated to a customer. For example, a UPF 286 may be instantiated for a first RBN 103 that is subsequently terminated, and being currently unallocated, the UPF 286 may be available for allocation to a second RBN 103. In such a situation, the PRBN management service 424 may ascertain whether the network function has sufficient capacity to serve the RBN 103 being provisioned. For example, a UPF 286 may be instantiated on a relatively low resource computing device 418 or virtual machine instance to serve one thousand user devices, and thus may be inadequate to serve ten thousand user devices anticipated for a newly provisioned RBN 103. Conversely, another UPF 286 may be provisioned with too much computing capacity, which would result in an inefficient use of resources if allocated to the newly provisioned RBN 103. In some embodiments, network functions may be shared among multiple RBNs 103.

In box 515, the PRBN management service 424 may configure one or more network slices for the radio-based network 103 that may provide differentiated quality-of-service levels for different user devices, applications, or services. The quality-of-service levels may provide different latency, bandwidth/throughput, signal strength, reliability, and/or other service factors. For example, the customer may have a set of devices that require very low latency, so the PRBN management service 424 may configure a network slice that provides latency under a threshold for those devices. In another example, a first quality-of-service level may be provided for a first application, and a second quality-of-service level may be provided for a second application.

In box 518, the PRBN management service 424 activates the RBN 103. In various scenarios, the RBN 103 may be activated immediately once capacity is allocated, at a future start time, or according to a periodic schedule. Also, portions of the RBN 103 covering a portion of an area or route may be activated before others or according to a schedule. Thereafter, the operation of the portion of the PRBN management service 424 ends.

Figure 5B:
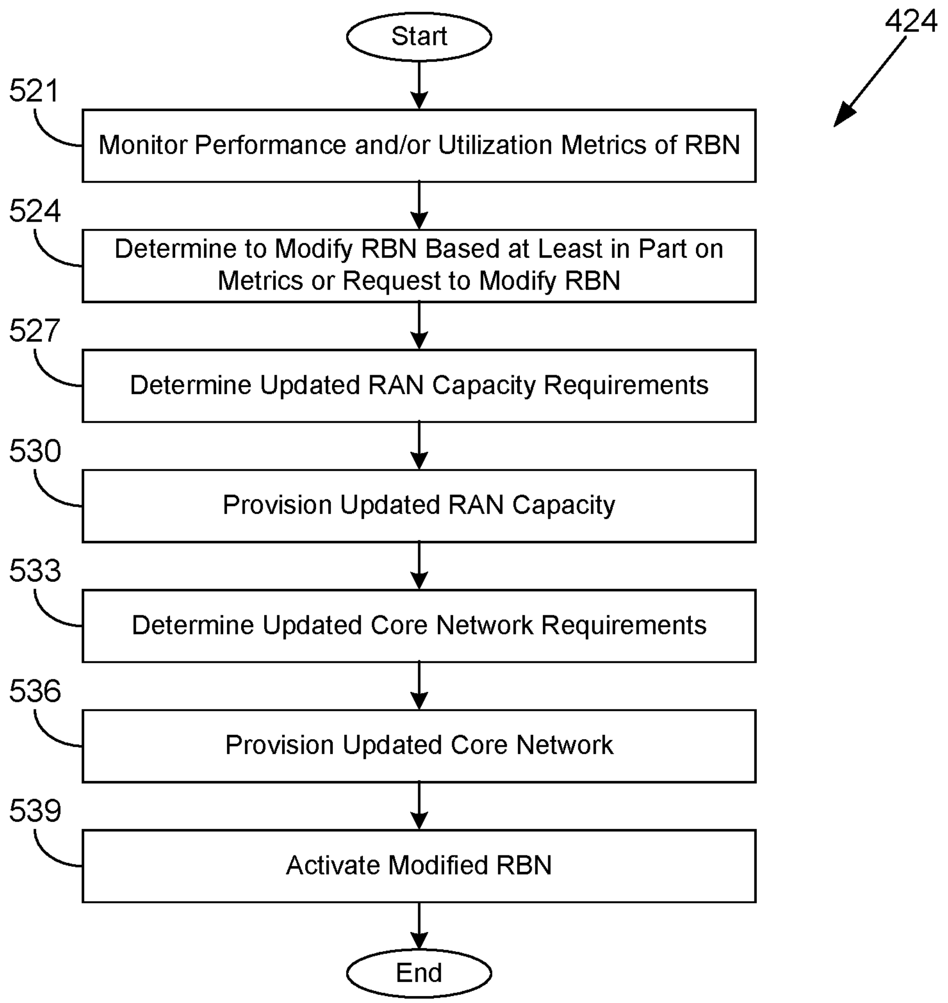

Continuing to FIG. 5B, shown is a flowchart that provides one example of the operation of another portion of the PRBN management service 424 according to various embodiments. It is understood that the flowchart of FIG. 5B provides merely an example of the many different types of functional arrangements that may be employed to implement the operation of the other portion of the PRBN management service 424 as described herein. As an alternative, the flowchart of FIG. 5B may be viewed as depicting an example of elements of a method implemented in the computing environment 403 (FIG. 4) according to one or more embodiments.

Beginning with box 521, the PRBN management service 424 monitors the performance and utilization metrics of the RBN 103 (FIG. 1A). For example, the PRBN management service 424 may gather RBN metrics 451 (FIG. 4) relating to dropped packets, latency values, bandwidth utilization, signal strength, interference, and so on, during the operation of the RBN 103. In box 524, the PRBN management service 424 determines to modify the RBN 103 based at least in part on the performance metrics and/or utilization metrics and/or a customer request to modify the RBN 103. For example, the PRBN management service 424 may determine that the observed performance falls beneath a minimum threshold, or that the observed utilization exceeds a maximum threshold. In such a case, the PRBN management service 424 may automatically scale a quantity of a VM instance, container, function, or other allocated computing capacity 421 (FIG. 4) performing a network function in the RBN 103. Alternatively, a customer may submit a request via a user interface or API to modify the RBN 103. Such a request may include OSS and BSS management requests to specify a level of access for specific devices or groups of devices on the RBN 103. The PRBN management service 424 can run network bandwidth and validation tests to provide monitoring and alert functionality for full visibility of how the RBN 103 is being used.

In box 527, the PRBN management service 424 updated RAN capacity requirements. This may involve allocating additional capacity with existing RANs 409 (FIG. 4) that are used, allocating capacity with different RANs 409, or replacing current capacity in one RAN 409 with capacity in another RAN 409. This may also involve covering a different coverage area or route than what was originally provisioned for the RBN 103. In some cases, the PRBN management service 424 may switch reliance from RANs 409 of third-party communication service providers to RANs 409 of the cloud network provider 203 or of the customer when capacity in such RANs 409 becomes available or is able to meet current QoS requirements. The PRBN management service 424 may also generally switch RANs 409 in order to achieve lower cost or higher QoS.

In box 530, the PRBN management service 424 provisions the updated capacity with the RAN(s) 409 that have been determined in box 527. In some embodiments, the capacity may be reserved on a per-cell-site basis, for specified times or indefinitely. For example, where capacity is reserved for a route, capacity may be received at each cell site along the route at times in which user devices are predicted to be present along the route. The capacity may be released according to a schedule when the capacity is no longer necessary. Specific network slices may be provisioned within the RAN(s) 409 in order to meet Qos requirements. To provision the desired capacity (and also to release capacity that may no longer be required in view of an updated capacity allocation), the PRBN management service 424 may communicate with systems of the RANs 409 via the RAN interface 273 (FIG. 4).

In box 533, the PRBN management service 424 determines updated core network requirements. Based upon the modification, computing resources in the cloud provider network 203 (FIG. 2A) that are dedicated to the core network may need to be scaled up or down, or potentially relocated within the cloud provider network 203, such as either toward or away from an edge server 224 (FIG. 2A) or to a different region 306 (FIG. 3).

In box 536, the PRBN management service 424 provisions the updated core network, which may include instantiating additional network functions, replacing existing network functions with others of a different scale, terminating existing network functions, relocating network functions, and/or other changes. Deallocated network function instances may be kept running for purposes of more efficient allocation to other RBNs 103 or to the same RBN 103 in the future. In box 539, the PRBN management service 424 activates the modified RBN 103. Thereafter, the operation of the portion of the PRBN management service 424 ends.

Figure 6A:
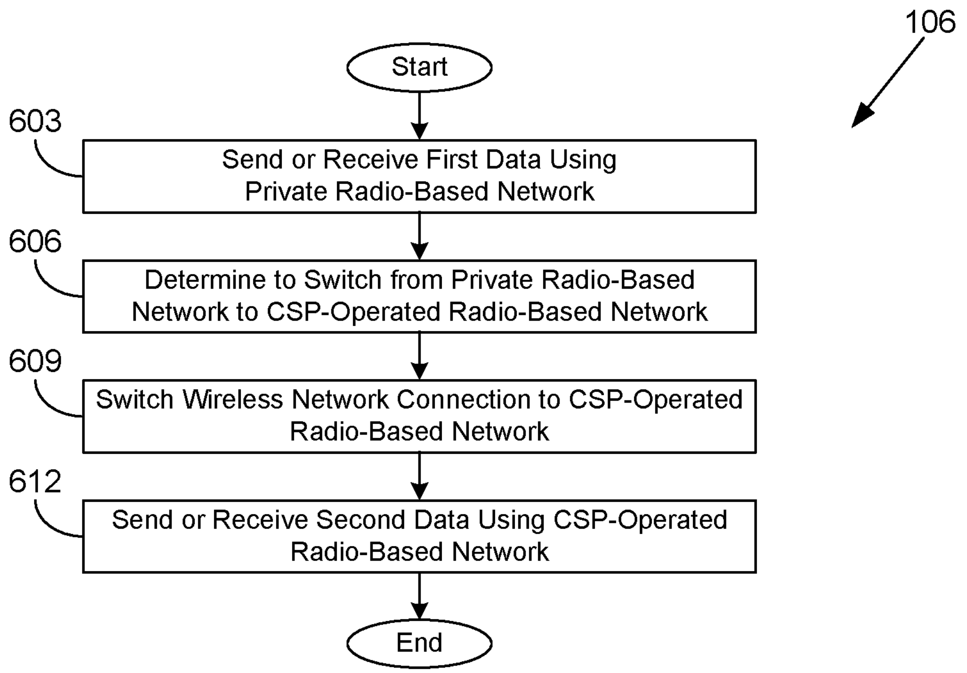
FIG. 6A is a flowchart illustrating an example of functionality implemented as portions of a client device in the communication network of FIG. 1A according to various embodiments of the present disclosure.

Moving on to FIG. 6A, shown is a flowchart that provides one example of the operation of a portion of a client device 106 according to various embodiments. It is understood that the flowchart of FIG. 6A provides merely an example of the many different types of functional arrangements that may be employed to implement the operation of the portion of the client device 106 as described herein. As an alternative, the flowchart of FIG. 6A may be viewed as depicting an example of elements of a method implemented in the client device 106 according to one or more embodiments.

Beginning with box 603, the client device 106 sends or receives first data using a private radio-based network 103 of an organization. The private radio-based network 103 may cover premises of the organization, potentially at multiple non-contiguous sites, and perhaps beyond. The private radio-based network 103 may use CBRS spectrum, television whitespace, and/or other allocated or shared spectrum. The first data may be of a particular data classification and sent or received via a particular application on the client device 106. For example, the client device 106 may be a UE device with support for multiple cellular networks and may be authorized to connect both to the private radio-based network 103 and to a CSP-operated radio-based network 103 (e.g., operated in licensed spectrum). The CSP-operated radio-based network 103 and the private radio-based network 103 may utilize a shared cellular standard, e.g., a 4G LTE standard, a 5G New Radio (NR) standard, a sixth-generation (6G) standard, etc.

In some implementations, the client device 106 may include two SIM cards, one for the private radio-based network 103 and the other for the CSP-operated radio-based network 103. In some implementations, the client device 106 may include an eSIM with two profiles, one for the private radio-based network 103 and the other for the CSP-operated radio-based network 103. In some implementations, the client device 106 may include a single SIM card, provisioned in both the private radio-based network 103 and the CSP-operated radio-based network 103 with coordination in the core networks of the respective networks to authorize the single SIM card. To this end, a core network function of the private radio-based network 103 may be in communication with a core network function of the CSP-operated radio-based network 103 to facilitate dual use of the same SIM card. In some cases, one or more core network functions for the private radio-based network 103 and the CSP-operated radio-based network 103 may be implemented in a same cloud provider network 203 or on one or more edge servers 224 of the cloud provider network 203, so that the private radio-based network 103 and the CSP-operated radio-based network 103 may at least partly share core network infrastructure hosted by a cloud service provider.

In box 606, the client device 106 determines to switch from the private radio-based network 103 to the CSP-operated radio-based network 103. The decision to switch networks may be made by logic in the client device 106 (e.g., an application or agent) or may be made in another device, e.g., by the mobility management service 427 in the computing environment 403, by a core network function, or by a RAN intelligent controller (RIC). The mobility management service 427 may be operated by the organization, by or behalf of the CSP, by or on behalf of a cloud service provider that also operates portions of either network, or another entity.

If the decision to switch networks is made by the mobility management service 427, the mobility management service 427 may send an instruction to the client device 106 (e.g., to an application or agent in the client device 106) to cause the client device 106 to perform a dynamic switch of networks. In some cases, the dynamic switching causes the client device 106 to disconnect from one network and connect to the other network. In other cases, the client device 106 may maintain connections with both networks simultaneously (e.g., using a dual SIM, a dual eSIM), and the dynamic switching may refer to configuring the client device 106 to use a particular one of the two networks instead of the other one for sending or receiving user plane network traffic. In this regard, the mobility management service 427 may maintain a persistent network connection with the client device 106 via the CSP-operated radio-based network 103 or the private radio-based network 103 (e.g., using a dual SIM, a dual eSIM, or via the Internet). The persistent network connection may be used in order to instruct the client device 106 both to switch networks and to switch back. In other examples, instead of a persistent network connection, the client device 106 may be listening or waiting for instruction events from the mobility management service 427, or the client device 106 may poll the mobility management service 427 for instructions.

The decision to switch networks may simply be due to the CSP-operated radio-based network 103 having a better signal (e.g., a higher or greater signal-to-noise ratio) than the private radio-based network 103. Alternatively, the decision to switch networks may be intelligently made based on various parameters. For example, the client device 106 may be moving away from coverage of the private radio-based network 103 in a predicted trajectory at a certain velocity so that the switch is performed before signal from the private radio-based network 103 is lost, thereby minimizing service interruptions in the client device 106. The decision to switch may also be made based upon the current location of the client device 106 as compared to a geofence (with the switch made relative to entry or exit through the geofence) or a proximity to a beacon at a known location (e.g., determined by signal strength of the beacon detected by the client device 106). In another example, the decision is made based upon a predicted network condition in either network, such as a predicted utilization in either network, where the utilization is predicted based at least in part on historical network utilization data, so that the usage is shifted from one network to another before degraded conditions are experienced.

The decision to switch may be made based at least in part on a particular application requesting to send data in the client device 106 using the wireless network connection, and/or a data type associated with the data. To illustrate, the type of data (or application used to send the data) may be less security-sensitive, making it appropriate to be transferred via the CSP-operated radio-based network 103 instead of the private radio-based network 103. In another example, the decision to switch may be driven by other network health metrics from the private radio-based network 103 (e.g., number of devices connected to the cell 109 used by the client device 106, throughput, operational status). In another example, the decision to switch may be made based at least in part on a usage history of the client device 106 and/or the application associated with the data to be transferred. To illustrate, the client device 106 may have bandwidth-heavy usage at predictable times of the day, but may use less bandwidth outside of those predictable times.

In box 609, the client device 106 switches the wireless network connection in the client device 106 from the private radio-based network 103 to the CSP-operated radio-based network. In one implementation, to effect the switch, the mobility management service 427 may dynamically provision an eSIM profile on the client device 106 to enable access to the CSP-operated radio-based network 103. In box 612, the client device 106 sends or receives data using the CSP-operated radio-based network 103 instead of the private radio-based network 103. Thereafter, the operation of the portion of the client device 106 ends. Subsequently, the client device 106 may determine to switch back to the private radio-based network 103. For example, a switch back may be prompted in response to a particular application no longer sending data via the wireless network connection of the client device 106, or a predicted network condition that is predicted to affect the CSP-operated radio-based network 103.

Figure 6B:
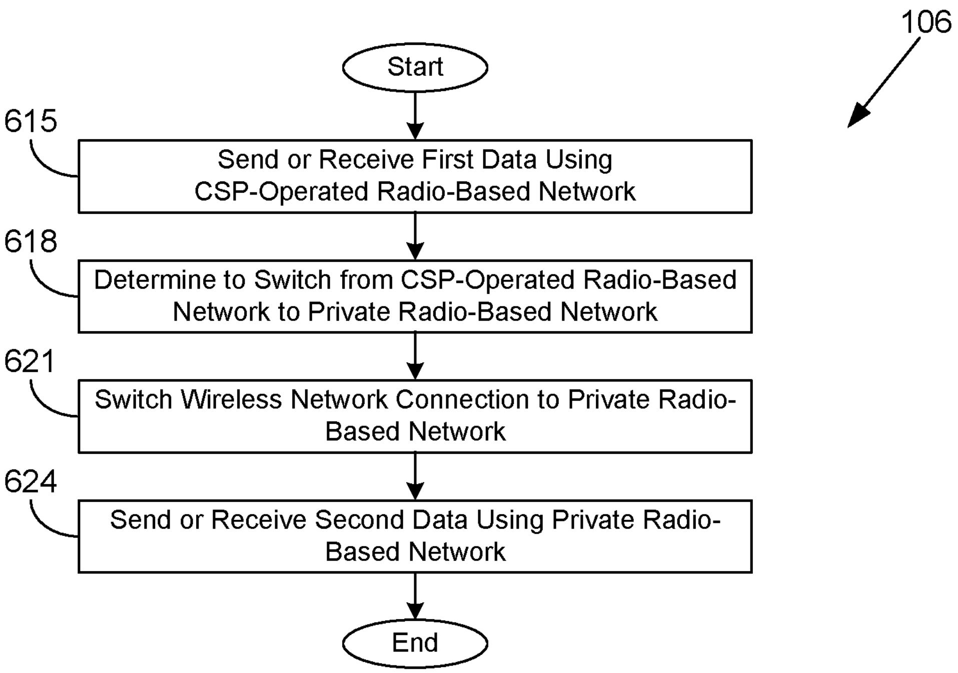
FIG. 6B is a flowchart illustrating an example of functionality implemented as portions of a client device in the communication network of FIG. 1A according to various embodiments of the present disclosure.

Continuing to FIG. 6B, shown is a flowchart that provides one example of the operation of a portion of a client device 106 according to various embodiments. It is understood that the flowchart of FIG. 6B provides merely an example of the many different types of functional arrangements that may be employed to implement the operation of the portion of the client device 106 as described herein. As an alternative, the flowchart of FIG. 6B may be viewed as depicting an example of elements of a method implemented in the client device 106 according to one or more embodiments.

Beginning with box 615, the client device 106 sends or receives first data using a CSP-operated radio-based network 103. The client device 106 may be affiliated with an organization that has a private radio-based network 103. The private radio-based network 103 may cover premises of the organization, potentially at multiple non-contiguous sites, and perhaps beyond. The private radio-based network 103 may use CBRS spectrum, television whitespace, and/or other allocated or shared spectrum. The first data may be of a particular data classification and sent or received via a particular application on the client device 106. For example, the client device 106 may be a UE device with support for multiple cellular networks and may be authorized to connect both to the private radio-based network 103 and to a CSP-operated radio-based network 103 (e.g., operated in licensed spectrum). The CSP-operated radio-based network 103 and the private radio-based network 103 may utilize a shared cellular standard, e.g., a 4G LTE standard, a 5G New Radio (NR) standard, a sixth-generation (6G) standard, etc.

In some implementations, the client device 106 may include two SIM cards, one for the private radio-based network 103 and the other for the CSP-operated radio-based network 103. In some implementations, the client device 106 may include an eSIM with two profiles, one for the private radio-based network 103 and the other for the CSP-operated radio-based network 103. In some implementations, the client device 106 may include a single SIM card, provisioned in both the private radio-based network 103 and the CSP-operated radio-based network 103 with coordination in the core networks of the respective networks to authorize the single SIM card. To this end, a core network function of the private radio-based network 103 may be in communication with a core network function of the CSP-operated radio-based network 103 to facilitate dual use of the same SIM card. In some cases, one or more core network functions for the private radio-based network 103 and the CSP-operated radio-based network 103 may be implemented in a same cloud provider network 203 or on one or more edge servers 224 of the cloud provider network 203, so that the private radio-based network 103 and the CSP-operated radio-based network 103 may at least partly share core network infrastructure hosted by a cloud service provider.

In box 618, the client device 106 determines to switch from the CSP-operated radio-based network 103 to the private radio-based network 103. The decision to switch networks may be made by logic in the client device 106 (e.g., an application or agent) or may be made in another device, e.g., by the mobility management service 427 in the computing environment 403, by a core network function, or by a RAN intelligent controller (RIC). The mobility management service 427 may be operated by the organization, by or behalf of the CSP, by or on behalf of a cloud service provider that also operates portions of either network, or another entity.

If the decision to switch networks is made by the mobility management service 427, the mobility management service 427 may send an instruction to the client device 106 (e.g., to an application or agent in the client device 106) to cause the client device 106 to perform a dynamic switch of networks. In some cases, the dynamic switching causes the client device 106 to disconnect from one network and connect to the other network. In other cases, the client device 106 may maintain connections with both networks simultaneously (e.g., using a dual SIM, a dual eSIM), and the dynamic switching may refer to configuring the client device 106 to use a particular one of the two networks instead of the other one for sending or receiving user plane network traffic. In this regard, the mobility management service 427 may maintain a persistent network connection with the client device 106 via the CSP-operated radio-based network 103 or the private radio-based network 103 (e.g., using a dual SIM, a dual eSIM, or via the Internet). The persistent network connection may be used in order to instruct the client device 106 both to switch networks and to switch back. In other examples, instead of a persistent network connection, the client device 106 may be listening or waiting for instruction events from the mobility management service 427, or the client device 106 may poll the mobility management service 427 for instructions.

The decision to switch networks may simply be due to the private radio-based network 103 having a better signal (e.g., a higher or greater signal-to-noise ratio) than the CSP-operated radio-based network 103. Alternatively, the decision to switch networks may be intelligently made based on various parameters. For example, the client device 106 may be toward coverage of the private radio-based network 103 in a predicted trajectory at a certain velocity so that the switch is performed before signal from the CSP-operated radio-based network 103 is lost, thereby minimizing service interruptions in the client device 106. The decision to switch may also be made based upon the current location of the client device 106 as compared to a geofence (with the switch made relative to entry or exit through the geofence) or a proximity to a beacon at a known location (e.g., determined by signal strength of the beacon detected by the client device 106). In another example, the decision is made based upon a predicted network condition in either network, such as a predicted utilization in either network, where the utilization is predicted based at least in part on historical network utilization data, so that the usage is shifted from one network to another before degraded conditions are experienced.

The decision to switch may be made based at least in part on a particular application requesting to send data in the client device 106 using the wireless network connection, and/or a data type associated with the data. To illustrate, the type of data (or application used to send the data) may be more security-sensitive, making it necessary to transfer the data via the private radio-based network 103 instead of the CSP-operated radio-based network 103. In another example, the decision to switch may be driven by other network health metrics from the private radio-based network 103 (e.g., number of devices connected to the cell 109 used by the client device 106, throughput, operational status). In another example, the decision to switch may be made based at least in part on a usage history of the client device 106 and/or the application associated with the data to be transferred. To illustrate, the client device 106 may have bandwidth-heavy usage at predictable times of the day, but may use less bandwidth outside of those predictable times.

In another scenario, the decision to switch to the private radio-based network 103 may be based at least in part on edge computing resources available through the private radio-based network 103. For example, an edge server 224 (FIG. 2A) may be hosted on premises of the organization, and applications hosted on the edge servers 224 may have significantly lower network latency when accessed via the private radio-based network 103 instead of the CSP-operated radio-based network 103. In some cases, the applications hosted on the edge servers 224 may be unavailable from the CSP-operated radio-based network 103, e.g., due to firewalling rules. Thus, if a client device 106 is to access the edge computing resources based on the identity of the client device 106, applications on the client device 106, and/or data being transferred to/from the client device 106, a decision may be made to switch the client device 106 to the private radio-based network 103, even in situations where the CSP-operated radio-based network 103 offers a better signal or more bandwidth than the private radio-based network 103. Generally, traffic preferences may be established so that the client device 106 prefers and switches to the private radio-based network 103 whenever it is in range.

In box 621, the client device 106 switches the wireless network connection in the client device 106 from the CSP-operated radio-based network 103 to the private radio-based network. In one implementation, to effect the switch, the mobility management service 427 may dynamically provision an eSIM profile on the client device 106 to enable access to the private radio-based network 103. In another implementation, dual eSIM profiles are pre-provisioned on the client device 106, and the mobility management service 427 causes the eSIM profiles to be active or inactive to facilitate the switch. In box 624, the client device 106 sends or receives data using the private radio-based network 103 instead of the CSP-operated radio-based network 103. In some embodiments, the client device 106 remains connected to both the private radio-based network 103 and the CSP-operated radio-based network 103. For example, both connections may be used simultaneously to increase bandwidth. In some scenarios, certain applications or data may be forced to transfer via the private radio-based network 103 instead of the CSP-operated radio-based network 103, even though both networks are available. Thereafter, the operation of the portion of the client device 106 ends.

Subsequently, the client device 106 may determine to switch back to the CSP-operated radio-based network 103. For example, a switch back may be prompted in response to a particular application no longer sending data via the wireless network connection of the client device 106, or a predicted network condition that is predicted to affect the private radio-based network 103.

Figure 6C:
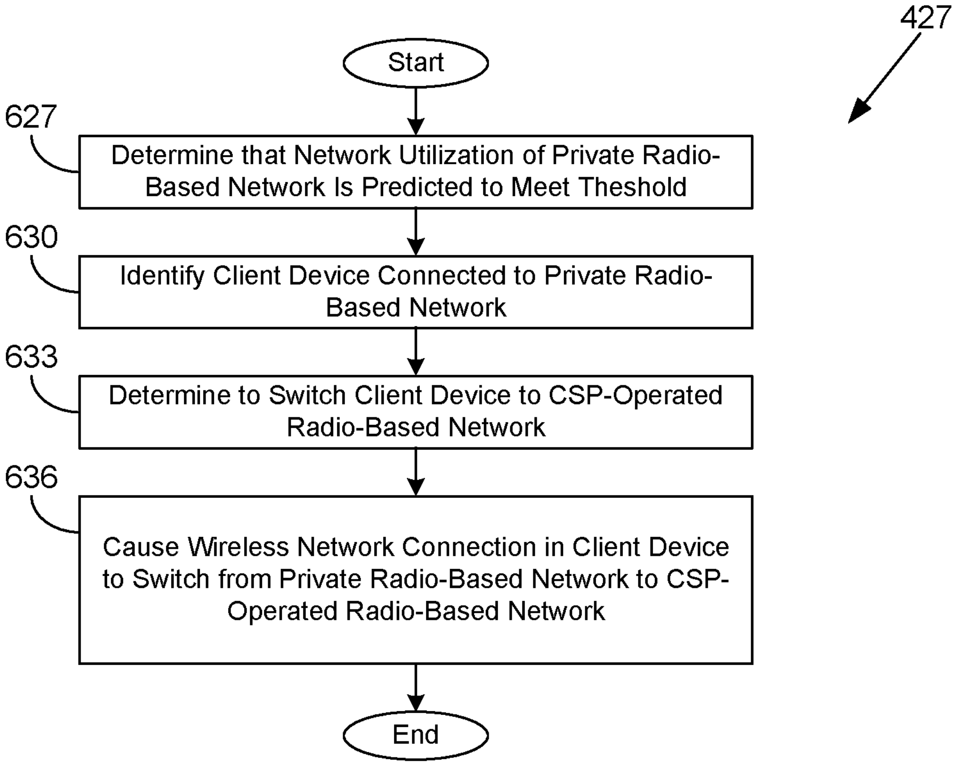
FIG. 6C is a flowchart illustrating an example of functionality implemented as portions of a mobility management service executed in a computing environment in the networked environment of FIG. 4 according to various embodiments of the present disclosure.

Referring next to FIG. 6C, shown is a flowchart that provides one example of the operation of a portion of the mobility management service 427 according to various embodiments. It is understood that the flowchart of FIG. 6C provides merely an example of the many different types of functional arrangements that may be employed to implement the operation of the portion of the mobility management service 427 as described herein. As an alternative, the flowchart of FIG. 6C may be viewed as depicting an example of elements of a method implemented in the computing environment 403 (FIG. 4) according to one or more embodiments.

Beginning with box 627, the mobility management service 427 determines that the network utilization of a private radio-based network 103 is predicted to meet a utilization threshold. The determination may apply to the entire private radio-based network 103 or to one or more specific cells 109 of the private radio-based network 103. The determination may be based at least in part on historical network utilization data.

In box 630, the mobility management service 427 identifies a client device 106 connected to the private radio-based network 103, where the client device 106 is capable of connecting to a CSP-operated radio-based network 103. The client device 106 may be identified as a device connected to an overutilized cell 109 of the private radio-based network 103. The client device 106 may also be identified based on various characteristics as being suitable for transfer to the CSP-operated radio-based network 103 (e.g., location, predicted location, security classification, etc.). For example, the client device 106 may be at the coverage edge of the private radio-based network 103, the client device 106 may be not a particularly security-sensitive device, not using a security-sensitive application, or not sending security-sensitive types of data (e.g., identified by destination, protocols, and/or ports).

In box 633, the mobility management service 427 determines to switch the client device 106 to the CSP-operated radio-based network 103. For example, the mobility management service 427 may determine that the client device 106 is at a location to receive sufficient signal from the CSP-operated radio-based network 103. The mobility management service 427 may analyze the usage history for the client device 106 to predict that the client device 106 will not need to reconnect to the private radio-based network 103 unnecessarily soon. In some cases, the mobility management service 427 may be implemented partly or wholly in a core network function or in a RAN intelligent controller (RIC).

In box 636, the mobility management service 427 causes the wireless network connection in the client device 106 to switch from the private radio-based network 103 to the CSP-operated radio-based network 103. For example, the mobility management service 427 may send an instruction to an application or agent on the client device 106 that causes the client device 106 to switch the connection. Alternatively, the mobility management service 427 may cause the connection of the client device 106 to the private radio-based network 103 to be dropped, causing a handover to the CSP-operated radio-based network 103. In some cases, the mobility management service 427 may configure the wireless network connection of the client device 106 to be switched at a predetermined time (e.g., based upon trajectory, velocity, predicted usage, and/or other factors). Subsequently, the mobility management service 427 may determine to switch the client device 106 back to private radio-based network 103. Thereafter, the operation of the mobility management service 427 ends.

Figure 6D:
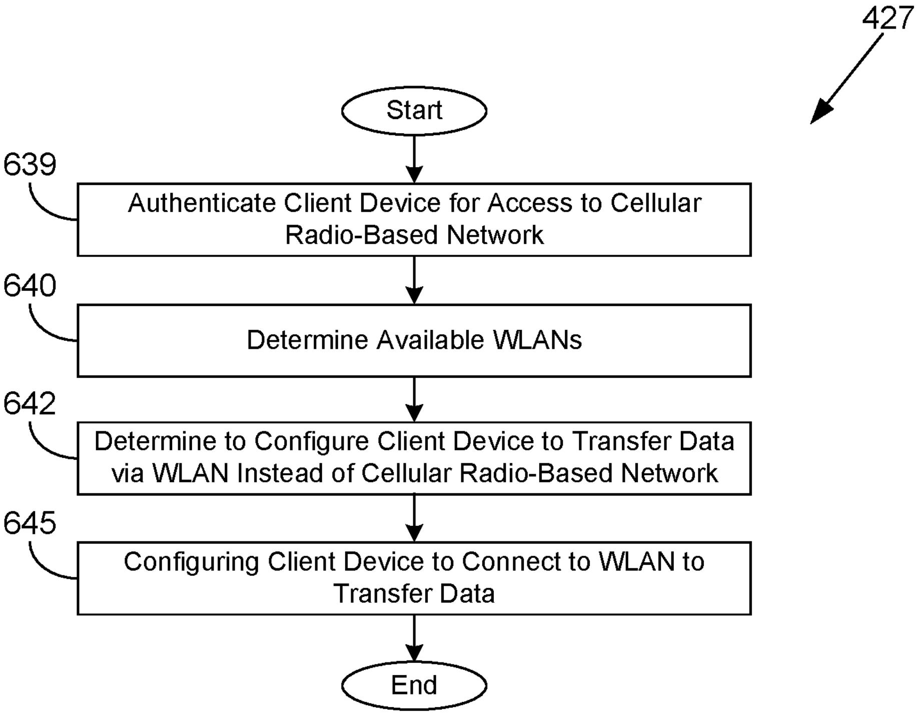
FIG. 6D is a flowchart illustrating an example of functionality implemented as portions of a mobility management service executed in a computing environment in the networked environment of FIG. 4 according to various embodiments of the present disclosure.

Turning now to FIG. 6D, shown is a flowchart that provides one example of the operation of a portion of the mobility management service 427 according to various embodiments. It is understood that the flowchart of FIG. 6D provides merely an example of the many different types of functional arrangements that may be employed to implement the operation of the portion of the mobility management service 427 as described herein. As an alternative, the flowchart of FIG. 6D may be viewed as depicting an example of elements of a method implemented in the computing environment 403 (FIG. 4) according to one or more embodiments.

Beginning with box 639, the mobility management service 427 authenticates a client device 106 for access to a cellular radio-based network 103. For example, the client device 106 may present a credential from an eSIM profile that authorizes access to the cellular radio-based network 103.

In box 640, the mobility management service 427 determines one or more WLANs that are available to the client device 106. For example, the mobility management service 427 may receive or determine a location of the client device 106, and then use the location to identify nearby WLANs to which access is permitted. In some cases, the client device 106 may report a list of WLANs and their signal strengths to the mobility management service 427. The WLANs may be identified by their basic service set identifiers (BSSID), their media access control (MAC) addresses, and/or other identifying information. Certificate pinning and/or other techniques may be used to avoid spoofing of BSSIDs and/or other identifying information for the WLAN access points.

In box 642, the mobility management service 427 determines to configure the client device 106 to transfer data via a WLAN or Wi-Fi instead of the cellular radio-based network 103. In one scenario, the cellular radio-based network 103 may be a private radio-based network 103 operated for an organization, and the WLAN may be operated by or on behalf of the organization. WLAN offloading may be used to shed data transfer loads from the cellular radio-based network 103 onto a WLAN with ample bandwidth. The determination may be based on the amount of data to be transferred (e.g., large data beyond a threshold), a classification associated with the data (e.g., not subject to security requirements that would make it not be possible to send over the WLAN), the particular application transferring the data, the client device 106 transferring the data, the location of the client device 106 relative to access points of the WLAN, and/or other factors.

In another scenario, the decision to utilize the WLAN for data transfer may be based at least in part on edge computing resources available through the WLAN. For example, an edge server 224 (FIG. 2A) may be hosted on premises of the organization, and applications hosted on the edge servers 224 may have significantly lower network latency when accessed via the WLAN instead of the cellular radio-based network 103. In some cases, the applications hosted on the edge servers 224 may be unavailable from the cellular radio-based network 103, e.g., due to firewalling rules. Thus, if a client device 106 is to access the edge computing resources based on the identity of the client device 106, applications on the client device 106, and/or data being transferred to/from the client device 106, a decision may be made to switch the client device 106 to the cellular radio-based network 103, even in situations where the cellular radio-based network 103 offers a better signal or more bandwidth than the WLAN. Generally, traffic preferences may be established so that the client device 106 prefers to perform data transfer using the WLAN when the WLAN is in range.

In some cases, the determination to use the WLAN for data transfer instead of the cellular radio-based network 103 may be made in the client device 106 itself. In some cases, the determination may be based at least in part on a network utilization of the cellular radio-based network 103 and/or a network utilization of the WLAN, or specifically the respective cell or access point used by the client device 106. The determination may be based at least in part on a signal strength of the cellular radio-based network 103 at the client device 106, a signal strength of the WLAN at the client device 106, a proximity between a location of the client device 106 and a location of a WLAN access point, a predicted network utilization of the cellular radio-based network 103 and/or the WLAN determined based at least in part on historical network utilization data, and so on.

In box 645, the mobility management service 427 configures the client device 106 to connect to the WLAN to transfer the data. For example, the mobility management service 427 may send an access credential for accessing the WLAN to the client device 106, potentially in response to a request for the access credential from the client device 106. In one scenario, the mobility management service 427 may cause the access credential to be provisioned in another eSIM profile on the client device 106. The mobility management service 427 may send an instruction to an application or agent on the client device to transfer the data via the WLAN instead of the cellular radio-based network 103. The client device 106 may remain connected to the cellular radio-based network 103 as a control plane anchor point for a data plane connection using the WLAN. Subsequently, after completion of the data transfer, the mobility management service 427 may cause the client device 106 to utilize the cellular radio-based network 103 for data transfer and/or to disconnect from the WLAN. Thereafter, the operation of the portion of the mobility management service 427 ends.

Figure 6E:
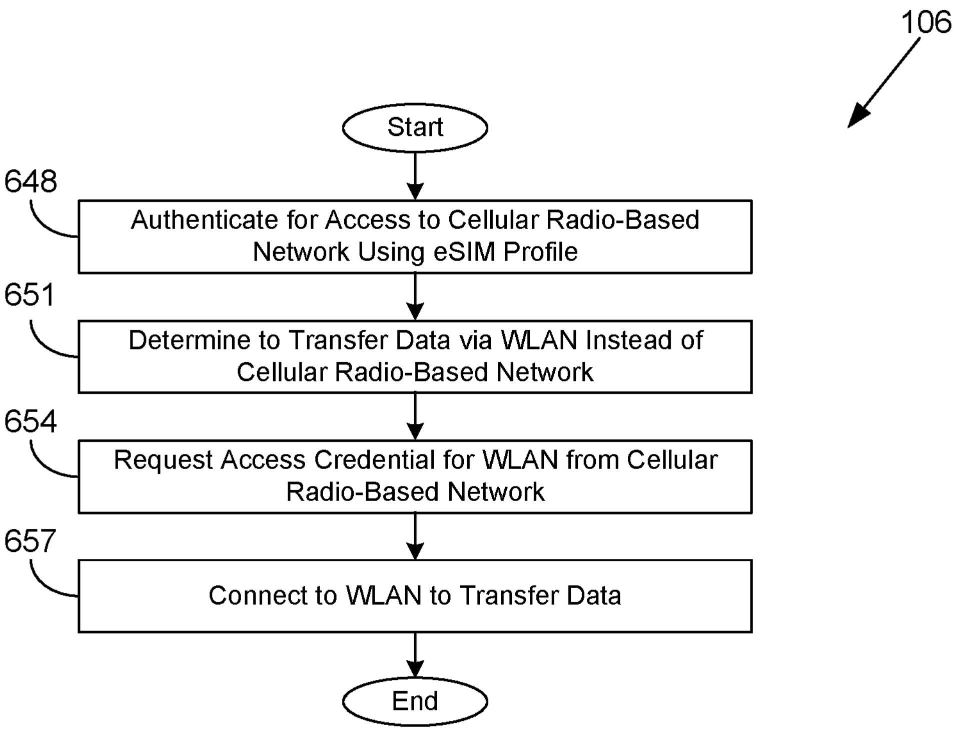
FIG. 6E is a flowchart illustrating an example of functionality implemented as portions of a client device in the communication network of FIG. 1A according to various embodiments of the present disclosure.

Referring to FIG. 6E, shown is a flowchart that provides one example of the operation of a portion of the client device 106 according to various embodiments. It is understood that the flowchart of FIG. 6E provides merely an example of the many different types of functional arrangements that may be employed to implement the operation of the portion of the client device 106 as described herein. As an alternative, the flowchart of FIG. 6E may be viewed as depicting an example of elements of a method implemented in the client device 106 according to one or more embodiments.

Beginning with box 648, the client device 106 authenticates for access to a cellular radio-based network 103 using an eSIM profile. For example, the client device 106 may present a credential from an eSIM profile that authorizes access to the cellular radio-based network 103.

In box 651, the client device 106 determines to transfer data via a WLAN instead of a cellular radio-based network 103. In one scenario, the cellular radio-based network 103 may be a private radio-based network 103 operated for an organization, and the WLAN may be operated by or on behalf of the organization. WLAN offloading may be used to shed data transfer loads from the cellular radio-based network 103 onto a WLAN with ample bandwidth. The determination may be based on the amount of data to be transferred (e.g., large data beyond a threshold), a classification associated with the data (e.g., not subject to security requirements that would make it not be possible to send over the WLAN), the particular application transferring the data, the client device 106 transferring the data, the location of the client device 106 relative to access points of the WLAN, and/or other factors.

In some cases, the determination may be based at least in part on a network utilization of the cellular radio-based network 103 and/or a network utilization of the WLAN, or specifically the respective cell or access point used by the client device 106. The determination may be based at least in part on a signal strength of the cellular radio-based network 103 at the client device 106, a signal strength of the WLAN at the client device 106, a proximity between a location of the client device 106 and a location of a WLAN access point, a predicted network utilization of the cellular radio-based network 103 and/or the WLAN determined based at least in part on historical network utilization data, and so on.

In box 654, the client device 106 requests an access credential for the WLAN from a function on the cellular radio-based network 103. The access credential may be supplied as part of another profile in the eSIM of the client device 106. In other examples, the access credential may be provisioned on the client device 106 through an application or agent. In box 657, the client device 106 connects to the WLAN to transfer the data, while remaining connected to the cellular radio-based network 103 as a control plane anchor point. Thereafter, the operation of the portion of the client device 106 ends.

Figure 7:
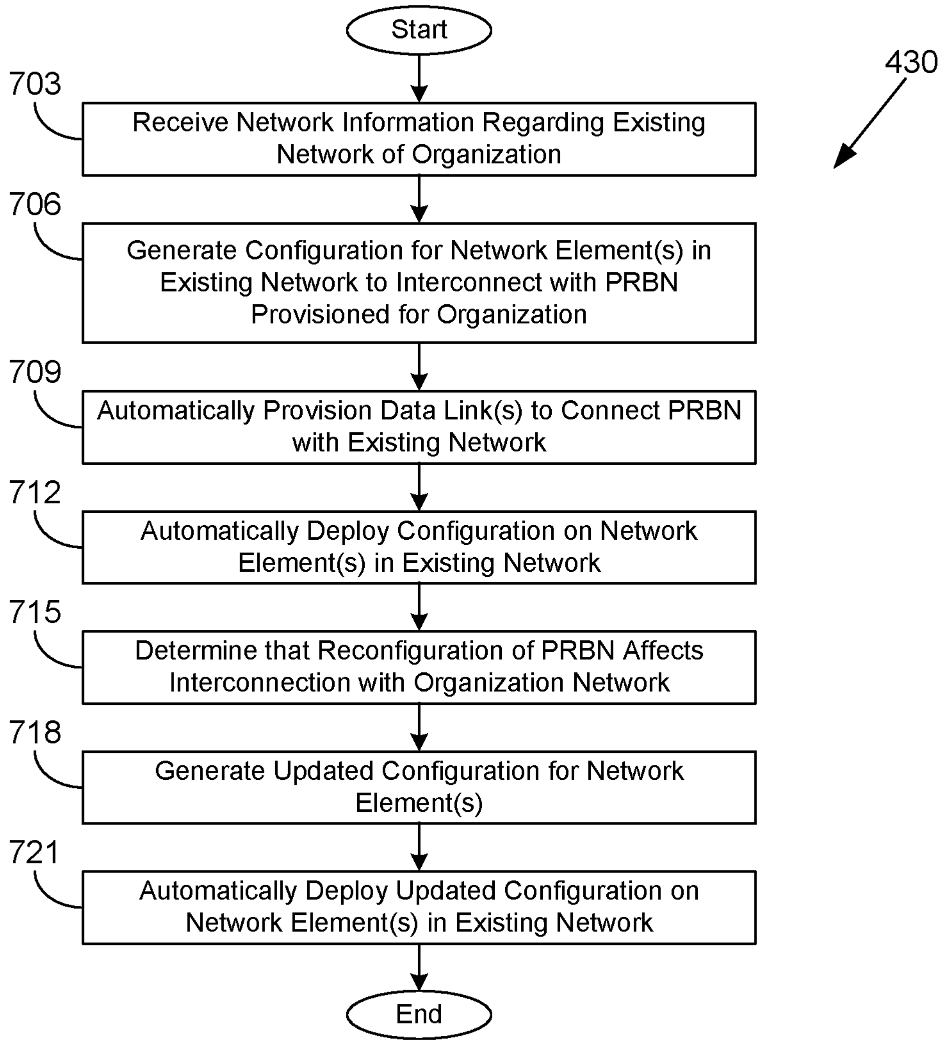
FIG. 7 is a flowchart illustrating an example of functionality implemented as portions of a network interconnection service executed in a computing environment in the networked environment of FIG. 4 according to various embodiments of the present disclosure.

Moving to FIG. 7, shown is a flowchart that provides one example of the operation of a portion of the network interconnection service 430 according to various embodiments. It is understood that the flowchart of FIG. 7 provides merely an example of the many different types of functional arrangements that may be employed to implement the operation of the portion of the network interconnection service 430 as described herein. As an alternative, the flowchart of FIG. 7 may be viewed as depicting an example of elements of a method implemented in the computing environment 403 (FIG. 4) according to one or more embodiments.

Beginning with box 703, the network interconnection service 430 receives, via an interface such as an API or user interface, network information regarding an existing organization network 163 of an organization. The network information may describe a logical network topology with various network elements 163. The network information may also describe a physical layout of the organizations' premises covered by the existing organization network 163. The organization may be in process of setting up a private radio-based network 103 by providing via the interface a plurality of parameters for dynamically provisioning the private radio-based network 103 for the organization using a RAN 409 of a CSP. The private radio-based network 103 may be dynamically provisioned for the organization based at least in part on the parameters, as in the flowchart of FIG. 5A. In some cases, a core network of the private radio-based network 103 may be at least partly implemented in a cloud provider network 203.

As part of dynamically provisioning the private radio-based network 103, the private radio-based network (PRBN) management service 424 may automatically determine an infrastructure necessary to cover a premises of an organization or another designated area with a particular service quality, including a number of cells, spectrum for the cells, operational parameters. The PRBN management service 424 may determine software components necessary for a use case, including the locations of network functions, such as at an edge location or in a region of a cloud provider network 203. The PRBN management service 424 may preconfigure the equipment, including the cells, radio units, distributed units, centralized units, edge computing devices, and/or other equipment. With such preconfiguration, when the equipment is turned on, the equipment may communicate with a service in the cloud provider network 203 to obtain additional software or configuration and cause network components such as network functions to be launched in the core network.

In some cases, one or more rules may be received via the interface defining what types of network traffic should be permitted to cross from the existing organization network 163 into the private radio-based network 103 or from the private radio-based network 103 into the existing organization network 163. In some cases, credentials to authorize configuration access to the network elements 166 may be received via the interface. Such credentials may take the form of certificates, usernames/passwords, and other credentials. In various scenarios, the credentials may enable superuser access on the network elements 166 or limited configuration access (e.g., special purpose access) on the network elements.

In box 706, the network interconnection service 430 generates a configuration (or configuration template) for one or more network elements 163 in the existing organization network 163 in order for the existing organization network 163 to interconnect with a private radio-based network 103 provisioned for the organization by a communication service provider or cloud provider. The network elements 163 may correspond to routers, gateways, firewalls, or other devices that represent "touch points" for the existing organization network 163. For example, the configuration may cause the network element 166 to perform network address translation for devices on the existing organization network 163 to communicate with devices on the private radio-based network 103. Alternatively, the same may be accomplished by implementing an IPv4 to IPv6 gateway.

In box 709, the network interconnection service 430 may automatically provision one or more data links 169 to connect the private radio-based network 103 with the existing organization network 163. For example, the data link 169 may utilize a backbone of a cloud provider network 203 to connect a core network at least partly implemented in the cloud provider network 203. The data link 169 may comprise, for example, a dedicated data connection between premises of the organization and a region 306 of a cloud provider network 203. In some cases, the core network functions may be hosted by resources on a virtual private cloud of the organization or the CSP in the cloud provider network 203.

In box 712, if authorized to do so, the network interconnection service 430 may automatically deploy the generated configurations on the network elements 166 in the existing organization network 163, e.g., using the received credential(s). Alternatively, the network interconnection service 430 may present the configuration template to a user for manual configuration on the network elements 166.

In box 715, the network interconnection service 430 may determine that a reconfiguration of the private radio-based network 103 may affect interconnection with the existing organization network 163. For example, the IP addresses for gateways in the private radio-based network 103 may change, additional gateways may be added, gateways may be removed, software updated, and so on. In box 718, the network interconnection service 430 generates an updated configuration (or a configuration template) for the network elements 166 of the existing organization network 163 that are determined to be affected. In box 721, if authorized to do so, the network interconnection service 430 may automatically deploy the generated updated configurations on the affected network elements 166 in the existing organization network 163. Alternatively, the network interconnection service 430 may present the configuration template to a user for manual configuration on the network elements 166. Thereafter, the operation of the portion of the network interconnection service 430 ends.

Figure 8:
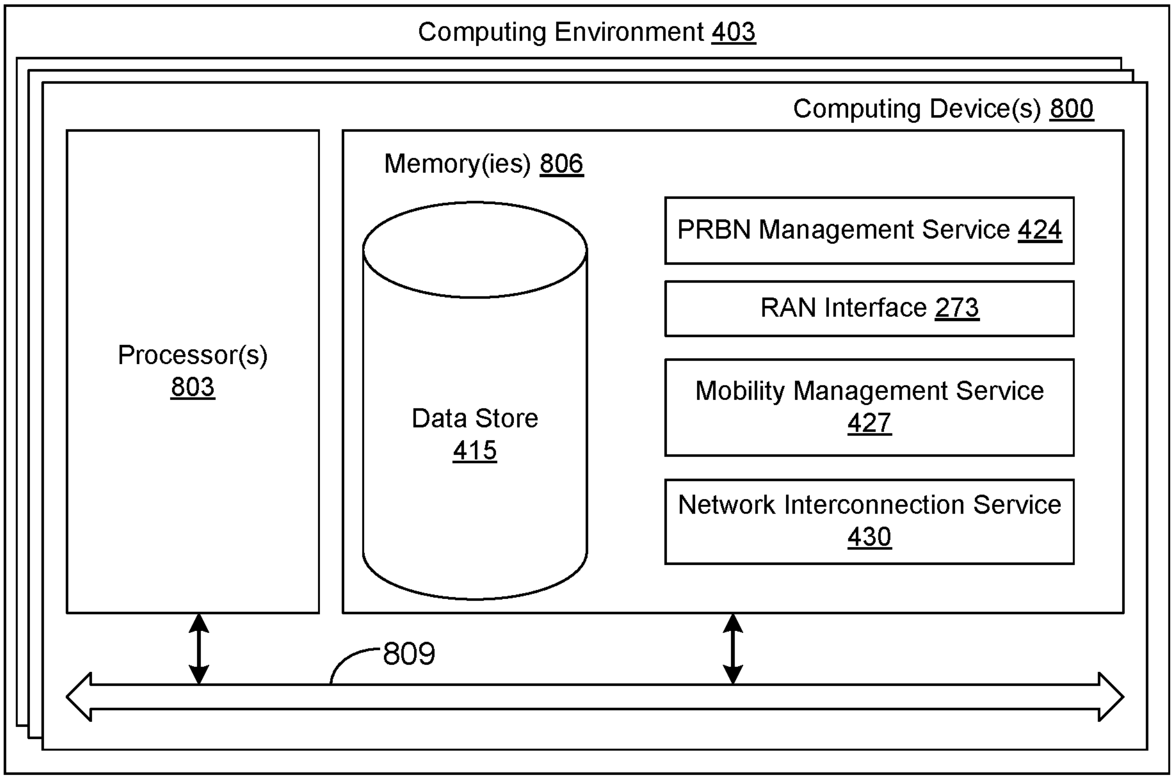
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the PRBN management service 424, the mobility management service 427, the network interconnection service 430, the RAN interface 273 and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the PRBN management service 424, the RAN interface 273, the mobility management service 427, the network interconnection service 430, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5A-7 show the functionality and operation of an implementation of portions of the PRBN management service 424, the client device 106, the mobility management service 427, and the network interconnection service 430. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5A-7 show a specific order of execution, it is understood that the order of execution may differ from that which is depicted. For example, the order of execution of two or more blocks may be scrambled relative to the order shown. Also, two or more blocks shown in succession in FIGS. 5A-7 may be executed concurrently or with partial concurrence. Further, in some embodiments, one or more of the blocks shown in FIGS. 5A-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the PRBN management service 424, the RAN interface 273, the mobility management service 427, and the network interconnection service 430, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the PRBN management service 424, the RAN interface 273, the mobility management service 427, and the network interconnection service 430, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Embodiments of the present disclosure may be described in one or more of the following clauses:

Clause 1. A system, comprising: a private radio-based network using Citizens Broadband Radio Service (CBRS) spectrum; a communication service provider (CSP)-operated radio-based network using licensed spectrum; and a mobility management service configured to at least dynamically switch user equipment authorized to access both the private radio-based network and the CSP-operated radio-based network from the private radio-based network to the CSP-operated radio-based network.

Clause 2. The system of clause 1, wherein the mobility management service is further configured to at least dynamically switch the user equipment from the CSP-operated radio-based network to the private radio-based network.

Clause 3. The system of clauses 1 to 2, wherein dynamically switching the user equipment from the private radio-based network to the CSP-operated radio-based network further comprises dynamically provisioning an electronic SIM (eSIM) profile on the user equipment to enable access to the CSP-operated radio-based network.

Clause 4. The system of clauses 1 to 3, wherein one or more core network functions for the CSP-operated radio-based network and the private radio-based network are implemented in a cloud provider network.

Clause 5. The system of clauses 1 to 4, wherein the mobility management service is executed in a cloud provider network.

Clause 6. The system of clauses 1 to 5, wherein the mobility management service is executed in the user equipment.

Clause 7. The system of clauses 1 to 6, wherein the user equipment includes a first subscriber identity module (SIM) card to authorize access to the private radio-based network and a second SIM card to authorize access to the CSP-operated radio-based network.

Clause 8. The system of clauses 1 to 7, wherein the user equipment includes an electronic SIM (eSIM) having a first profile authorizing access to the private radio-based network and a second profile authorizing access to the CSP-operated radio-based network.

Clause 9. The system of clauses 1 to 8, wherein the user equipment includes a SIM card provisioned in the private radio-based network and the CSP-operated radio-based network, and a core network function of the private radio-based network is in communication with a core network function of the CSP-operated radio-based network to facilitate dual use of the SIM card.

Clause 10. A computer-implemented method, comprising: sending or receiving first data via a private radio-based network using a wireless network connection in a user equipment (UE) device; determining to switch the wireless network connection in the UE device from the private radio-based network to a communication service provider (CSP)-operated radio-based network, wherein the private radio-based network and the CSP-operated radio-based network utilize a cellular network standard; and instructing the UE device to switch the wireless network connection from the private radio-based network to the CSP-operated radio-based network, whereby the UE device sends or receives second data via the CSP-operated radio-based network using the wireless network connection in the UE device.

Clause 11. The computer-implemented method of clause 10, wherein a cloud provider network manages the private radio-based network, and a mobility management service executed in at least one of: the cloud provider network or the UE device instructs the UE device to switch the wireless network connection.

Clause 12. The computer-implemented method of clauses 10 to 11, further comprising: determining to switch the wireless network connection in the UE device from the CSP-operated radio-based network to the private radio-based network; switching the wireless network connection from the CSP-operated radio-based network to the private radio-based network; and sending or receiving third data via the private radio-based network using the wireless network connection in the UE device.

Clause 13. The computer-implemented method of clauses 10 to 12, wherein the CSP-operated radio-based network uses licensed spectrum, and the private radio-based network uses Citizens Broadband Radio Service (CBRS) spectrum.

Clause 14. The computer-implemented method of clauses 10 to 13, wherein the UE device includes a first subscriber identity module (SIM) card to authorize access to the private radio-based network and a second SIM card to authorize access to the CSP-operated radio-based network.

Clause 15. The computer-implemented method of clauses 10 to 14, wherein the UE device includes an electronic SIM (eSIM) having a first profile authorizing access to the private radio-based network and a second profile authorizing access to the CSP-operated radio-based network.

Clause 16. The computer-implemented method of clauses 10 to 15, wherein the UE device includes a SIM card provisioned in the private radio-based network and the CSP-operated radio-based network.

Clause 17. A computer-implemented method, comprising: sending or receiving first data via a communication service provider (CSP)-operated radio-based network using a wireless network connection to a user equipment (UE) device; determining to switch the wireless network connection in the UE device from the communication service provider (CSP)-operated radio-based network to a private radio-based network, wherein the private radio-based network and the CSP-operated radio-based network utilize a Fifth-Generation New Radio (5G NR) standard; instructing the UE device to switch the wireless network connection from the CSP-operated radio-based network to the private radio-based network; and sending or receiving second data via the private radio-based network using the wireless network connection to the UE device.

Clause 18. The computer-implemented method of clause 17, wherein a provider entity manages the private radio-based network, and determining to switch the wireless network connection is performed by a mobility management service executed in a provider network of the provider entity, or the provider network sends the mobility management service to the UE device.

Clause 19. The computer-implemented method of clauses 17 to 18, wherein the private radio-based network is configured to cover one or more premises of an organization, and the private radio-based network utilizes television whitespace spectrum.

Clause 20. The computer-implemented method of clauses 17 to 19, wherein the private radio-based network and the CSP-operated radio-based network at least partly share core network infrastructure hosted by a cloud service provider.

Clause 21. A system, comprising: a private radio-based network using Citizens Broadband Radio Service (CBRS) spectrum; a communication service provider (CSP)-operated radio-based network using licensed spectrum; and a mobility management service configured to at least: determine to switch a wireless network connection in user equipment authorized to connect to both the private radio-based network and the CSP-operated radio-based network from the CSP-operated radio-based network to the private radio-based network based at least in part on at least one of: a particular application requesting to send data via the wireless network connection, a data type associated with the data, an edge computing resource available through the private radio-based network, or a predicted network condition that is predicted to affect the CSP-operated radio-based network; and cause the wireless network connection to switch from the CSP-operated radio-based network to the private radio-based network.

Clause 22. The system of clause 21, wherein the mobility management service is configured to at least: determine, based at least in part on historical network utilization data, that the predicted network condition is predicted to affect the CSP-operated radio-based network at a future time; and instruct the user equipment to switch from the CSP-operated radio-based network to the private radio-based network.

Clause 23. The system of clauses 21 to 22, wherein the CSP-operated radio-based network and the private radio-based network utilize a core network at least partly implemented by a cloud provider network.

Clause 24. The system of clauses 21 to 23, wherein the user equipment includes at least one of: a first subscriber identity module (SIM) card authorizing access to the private radio-based network and a second SIM card authorizing access to the CSP-operated radio-network; an electronic SIM (eSIM) including a first profile authorizing access to the private radio-based network and a second profile authorizing access to the CSP-operated radio-network; or a SIM card authorizing access to both the private radio-based network and the CSP-operated radio-based network.

Clause 25. The system of clauses 21 to 24, wherein determining to switch the wireless network connection in the user equipment from the CSP-operated radio-based network to the private radio-based network is further based at least in part on at least one of: a location of the user equipment relative to a geofence or a detection of a beacon in the user equipment.

Clause 26. The system of clauses 21 to 25, wherein the mobility management service is further configured to at least: determine to switch the wireless network connection in the user equipment from the private radio-based network to the CSP-operated radio-based network based at least in part on at least one of: the particular application no longer sending data via the wireless network connection, or a predicted network condition that is predicted to affect the private radio-based network; and instruct the user equipment to switch the wireless network connection from the private radio-based network to the CSP-operated radio-based network.

Clause 27. A computer-implemented method, comprising: determining that a particular application executed in a user equipment (UE) device requests to transfer data via a wireless network connection; determining to switch the wireless network connection in the UE device from a communication service provider (CSP)-operated radio-based network to a private radio-based network based at least in part on the particular application or the data to be transferred by the particular application; causing the wireless network connection to switch from the CSP-operated radio-based network to the private radio-based network; and transferring the data via the wireless network connection using the private radio-based network.

Clause 28. The computer-implemented method of clause 27, further comprising: determining to switch the wireless network connection in the UE device from the private radio-based network to the CSP-operated radio-based network based at least in part on a completion of the particular application transferring data; and causing the wireless network connection to switch from the private radio-based network to the CSP-operated radio-based network.

Clause 29. The computer-implemented method of clauses 27 to 28, wherein determining to switch the wireless network connection in the UE device from the CSP-operated radio-based network to the private radio-based network is further based at least in part on the UE device being at a location within a geofence.

Clause 30. The computer-implemented method of clauses 27 to 29, wherein determining to switch the wireless network connection in the UE device from the CSP-operated radio-based network to the private radio-based network is further based at least in part on a predicted network utilization of at least one of: the private radio-based network or the CSP-operated radio-based network.

Clause 31. The computer-implemented method of clauses 27 to 30, wherein the CSP-operated radio-based network has a greater signal-to-noise ratio at the UE device than the private radio-based network.

Clause 32. The computer-implemented method of clauses 27 to 31, wherein the private radio-based network and the CSP-operated radio-based network utilize a cellular network standard.

Clause 33. A computer-implemented method, comprising: determining that a network utilization of a private radio-based network is predicted to meet a utilization threshold; identifying a user equipment (UE) device connected to the private radio-based network; determining to switch a wireless network connection in the UE device from a private radio-based network to a communication service provider (CSP)-operated radio-based network to reduce the network utilization on the private radio-based network; and causing the wireless network connection in the UE device to switch from the private radio-based network to the CSP-operated radio-based network.

Clause 34. The computer-implemented method of clause 33, wherein causing the wireless network connection in the UE device to switch from the private radio-based network to the CSP-operated radio-based network further comprises causing the wireless network connection in the UE device to switch from the private radio-based network to the CSP-operated radio-based network at a predetermined time.

Clause 35. The computer-implemented method of clauses 33 to 34, wherein causing the wireless network connection in the UE device to switch from the private radio-based network to the CSP-operated radio-based network further comprises instructing an application executed in the UE device to switch the wireless network connection from the private radio-based network to the CSP-operated radio-based network.

Clause 36. The computer-implemented method of clauses 33 to 35, wherein causing the wireless network connection in the UE device to switch from the private radio-based network to the CSP-operated radio-based network further comprises causing the private radio-based network to disconnect the wireless network connection with the UE device.

Clause 37. The computer-implemented method of clauses 33 to 36, wherein determining that the network utilization of the private radio-based network is predicted to meet the utilization threshold is based at least in part on historical network utilization data.

Clause 38. The computer-implemented method of clauses 33 to 37, wherein identifying the UE device is based at least in part on a classification assigned to the UE device.

Clause 39. The computer-implemented method of clauses 33 to 38, wherein identifying the UE device is based at least in part on at least one of: a current location of the UE device, or a predicted location of the UE device.

Clause 40. The computer-implemented method of clauses 33 to 39, wherein identifying the UE device is based at least in part on determining that the UE device receives a signal from the CSP-operated radio-based network that meets a signal-to-noise threshold.

Clause 41. A system, comprising: a wireless local area network (WLAN) using Wi-Fi; a cellular radio-based network using licensed or allocated spectrum; and a computing device configured to perform a network function for the cellular radio-based network, the network function comprising: authenticating a user equipment (UE) device for access to the cellular radio-based network using a profile in an electronic subscriber identity module (eSIM) of the UE device; determining to configure the UE device to transfer data via a wireless local area network (WLAN) rather than the cellular radio-based network; and configuring the UE device to connect to the WLAN to transfer the data.

Clause 42. The system of clause 41, wherein the network function further comprises sending an access credential for the WLAN from the cellular radio-based network to the UE device.

Clause 43. The system of clauses 41 to 42, wherein determining to configure the UE device to transfer the data via WLAN rather than the cellular radio-based network further comprises receiving an instruction to configure the UE device to transfer the data via WLAN rather than the cellular radio-based network.

Clause 44. The system of clauses 41 to 43, wherein determining to configure the UE device to transfer the data via WLAN rather than the cellular radio-based network is based at least in part on a classification of the data or a particular application transferring the data.

Clause 45. The system of clauses 41 to 44, wherein the network function further comprises: determining to configure the UE device to transfer subsequent data via the cellular radio-based network rather than the WLAN; and configuring the UE device to transfer the subsequent data using the cellular radio-based network.

Clause 46. The system of clauses 41 to 45, wherein the cellular radio-based network is a communication service provider (CSP)-operated radio-based network.

Clause 47. The system of clauses 41 to 46, wherein the cellular radio-based network is a private radio-based network operated for an organization, and the organization operates the WLAN.

Clause 48. A computer-implemented method, comprising: authenticating, by a user equipment (UE) device, for access to a cellular radio-based network using a profile in an electronic subscriber identity module (eSIM); determining, by the UE device, to transfer data via a wireless local area network (WLAN) rather than the cellular radio-based network; requesting, by the UE device, an access credential for the WLAN from the cellular radio-based network; and connecting, by the UE device using the access credential, to the WLAN to transfer the data.

Clause 49. The computer-implemented method of clause 48, wherein determining, by the UE device, to transfer the data via the WLAN rather than the cellular radio-based network is based at least in part on at least one of: a particular application transferring the data, or a classification associated with the data.

Clause 50. The computer-implemented method of clauses 48 to 49, wherein determining, by the UE device, to transfer the data via the WLAN rather than the cellular radio-based network is based at least in part on an instruction received from cellular radio-based network.

Clause 51. The computer-implemented method of clauses 48 to 50, wherein determining, by the UE device, to transfer the data via the WLAN rather than the cellular radio-based network is based at least in part on at least one of: a network utilization of the cellular radio-based network, or a network utilization of the WLAN.

Clause 52. The computer-implemented method of clauses 48 to 51, wherein determining, by the UE device, to transfer the data via the WLAN rather than the cellular radio-based network is based at least in part on at least one of: a signal strength of the cellular radio-based network at the UE device, or a signal strength of the WLAN at the UE device.

Clause 53. The computer-implemented method of clauses 48 to 52, further comprising disconnecting from the WLAN after transferring the data.

Clause 54. The computer-implemented method of clauses 48 to 53, wherein the cellular radio-based network functions as a control plane anchor point for a data plane connection between the UE device and the WLAN.

Clause 55. The computer-implemented method of clauses 48 to 54, further comprising receiving, by the UE device, the access credential encoded in another profile in the eSIM.

Clause 56. A computer-implemented method, comprising: authenticating a user equipment (UE) device for access to a cellular radio-based network using a profile in an electronic subscriber identity module (eSIM) of the UE device; determining to configure the UE device to transfer data via a wireless local area network (WLAN) rather than the cellular radio-based network; and configuring the UE device to connect to the WLAN to transfer the data.

Clause 57. The computer-implemented method of clause 56, further comprising sending an access credential for the WLAN to the UE device via the cellular radio-based network.

Clause 58. The computer-implemented method of clauses 56 to 57, further comprising: determining a location of the UE device; and wherein determining to configure the UE device to transfer the data via the WLAN rather than the cellular radio-based network is based at least in part on a proximity between the location of the UE device and a location of an access point of the WLAN.

Clause 59. The computer-implemented method of clauses 56 to 58, further comprising: determining a predicted network utilization for at least one of: the WLAN or the cellular radio-based network based at least in part on historical network utilization data; and wherein determining to configure the UE device to transfer the data via the WLAN rather than the cellular radio-based network is based at least in part on the predicted network utilization.

Clause 60. The computer-implemented method of clauses 56 to 59, further comprising: determining to configure the UE device to transfer subsequent data via the cellular radio-based network rather than the WLAN; and configuring the UE device to use the cellular radio-based network to transfer the subsequent data.

Clause 61. A system, comprising: a computing device; and a network interconnection service executed in the computing device and configured to at least: receive, via an interface corresponding to an application programming interface (API) or a user interface, a plurality of parameters for dynamically provisioning a private radio-based network for an organization using a radio access network of a communication service provider (CSP); dynamically provision the private radio-based network for the organization based at least in part on the plurality of parameters, wherein a core network of the private radio-based network is at least partly implemented in a cloud provider network; receive, via the interface, network topology information regarding an existing network of the organization; and automatically generate, based at least in part on the network topology information, a configuration for a network element in the existing network in order to interconnect the private radio-based network with the existing network, wherein the network element comprises one or more of: a router, a gateway, or a firewall.

Clause 62. The system of clause 61, wherein the network interconnection service is further configured to at least: receive, via the interface, a rule for network traffic between the existing network and the private radio-based network; and wherein the configuration is generated based at least in part on the rule.

Clause 63. The system of clauses 61 to 62, wherein the network interconnection service is further configured to at least: automatically generate, based at least in part on a reconfiguration of the private radio-based network, an updated configuration for the network element; and automatically deploy the updated configuration on the network element.

Clause 64. The system of clauses 61 to 63, wherein the network interconnection service is further configured to at least: receive, via the interface, a credential to authorize configuration access for the network element; and automatically deploy the configuration on the network element using the credential.

Clause 65. A computer-implemented method, comprising: receiving, via an interface, one or more parameters for provisioning a private radio-based network for an organization; receiving, via the interface, network information regarding an existing network of the organization; and generating, based at least in part on the network information, a configuration for a network element in the existing network in order to interconnect the private radio-based network with the existing network.

Clause 66. The computer-implemented method of clause 65, further comprising automatically provisioning a data link to connect the private radio-based network with the existing network.

Clause 67. The computer-implemented method of clause 66, wherein the data link utilizes a backbone of a cloud provider network to connect a core network at least partly implemented in the cloud provider network with the existing network.

Clause 68. The computer-implemented method of clauses 65 to 67, further comprising: receiving, via the interface, a rule for network traffic between the existing network and the private radio-based network; and wherein the configuration is generated based at least in part on the rule.

Clause 69. The computer-implemented method of clauses 65 to 68, wherein the configuration causes the network element to perform network address translation for a first device on the existing network to communicate with a second device on the private radio-based network.

Clause 70. The computer-implemented method of clauses 65 to 69, wherein the configuration causes the network element to implement an internet protocol (IP)v4-to-IPv6 gateway for a first device on the existing network to communicate with a second device on the private radio-based network.

Clause 71. The computer-implemented method of clauses 65 to 70, further comprising: receiving, via the interface, a credential to authorize configuration access for the network element; and automatically deploying the configuration on the network element using the credential.

Clause 72. The computer-implemented method of clauses 65 to 71, further comprising automatically generating, based at least in part on a reconfiguration of the private radio-based network, an updated configuration for the network element.

Clause 73. The computer-implemented method of clause 72, further comprising automatically deploying the updated configuration on the network element.

Clause 74. The computer-implemented method of clauses 65 to 73, wherein the network element comprises one or more of: a router, a gateway, or a firewall.

Clause 75. The computer-implemented method of clauses 65 to 74, wherein the interface comprises an application programming interface.

Clause 76. The computer-implemented method of clauses 65 to 75, wherein the interface comprises a user interface.

Clause 77. The computer-implemented method of clause 65 to 76, wherein the private radio-based network is operated by a communication service provider (CSP) for the organization.

Clause 78. A computer-implemented method, comprising: determining that a reconfiguration of a private radio-based network operated for an organization affects an interconnection of the private radio-based network with a network of the organization; and generating, based at least in part on network information of the network and the reconfiguration, an updated configuration for a network element in the network in order to maintain the interconnection of the private radio-based network with the network.

Clause 79. The computer-implemented method of clause 78, wherein the updated configuration modifies a network address translation for a first device on the network to communicate with a second device on the private radio-based network, or the updated configuration modifies implement an internet protocol (IP)v4-to-IPv6 gateway for the first device to communicate with the second device.

Clause 80. The computer-implemented method of clauses 78 to 79, wherein the network element comprises at least one of: a router, a gateway, or a firewall.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

a private radio-based network using Citizens Broadband Radio Service (CBRS) spectrum;

a communication service provider (CSP)-operated radio-based network using licensed spectrum; and a mobility management service configured to at least:

determine to switch a wireless network connection in user equipment authorized to connect to both the private radio-based network and the CSP-operated radio-based network from the CSP-operated radio-based network to the private radio-based network based at least in part on at least one of: a particular application requesting to send data via the wireless network connection, a data type associated with the data, an edge computing resource available through the private radio-based network, or a predicted network condition that is predicted to affect the CSP-operated radio-based network; and cause the wireless network connection to switch from the CSP-operated radio-based network to the private radio-based network, wherein each of the private radio-based network and the CSP-operated radio-based network utilizes a cellular network standard.

2. The system of claim 1, wherein the mobility management service is configured to at least:

determine, based at least in part on historical network utilization data, that the predicted network condition is predicted to affect the CSP-operated radio-based network at a future time; and instruct the user equipment to switch from the CSP-operated radio-based network to the private radio-based network.

3. The system of claim 1, wherein the CSP-operated radio-based network and the private radio-based network utilize a core network at least partly implemented by a cloud provider network.

4. The system of claim 1, wherein the user equipment includes at least one of:

a first subscriber identity module (SIM) card authorizing access to the private radio-based network and a second SIM card authorizing access to the CSP-operated radio-network;

an electronic SIM (eSIM) including a first profile authorizing access to the private radio-based network and a second profile authorizing access to the CSP-operated radio-network; or a SIM card authorizing access to both the private radio-based network and the CSP-operated radio-based network.

5. The system of claim 1, wherein determining to switch the wireless network connection in the user equipment from the CSP-operated radio-based network to the private radio-based network is further based at least in part on at least one of: a location of the user equipment relative to a geofence or a detection of a beacon in the user equipment.

6. The system of claim 1, wherein the mobility management service is further configured to at least:

determine to switch the wireless network connection in the user equipment from the private radio-based network to the CSP-operated radio-based network based at least in part on at least one of: the particular application no longer sending data via the wireless network connection, or a predicted network condition that is predicted to affect the private radio-based network; and instruct the user equipment to switch the wireless network connection from the private radio-based network to the CSP-operated radio-based network.

7. A computer-implemented method, comprising:

determining that a particular application executed in a user equipment (UE) device requests to transfer data via a wireless network connection;

determining to switch the wireless network connection in the UE device from a communication service provider (CSP)-operated radio-based network to a private radio-based network based at least in part on the particular application or the data to be transferred by the particular application;

causing the wireless network connection to switch from the CSP-operated radio-based network to the private radio-based network; and transferring the data via the wireless network connection using the private radio-based network, wherein each of the private radio-based network and the CSP-operated radio-based network utilizes a cellular network standard.

8. The computer-implemented method of claim 7, further comprising:

determining to switch the wireless network connection in the UE device from the private radio-based network to the CSP-operated radio-based network based at least in part on a completion of the particular application transferring data; and causing the wireless network connection to switch from the private radio-based network to the CSP-operated radio-based network.

9. The computer-implemented method of claim 7, wherein determining to switch the wireless network connection in the UE device from the CSP-operated radio-based network to the private radio-based network is further based at least in part on the UE device being at a location within a geofence.

10. The computer-implemented method of claim 7, wherein determining to switch the wireless network connection in the UE device from the CSP-operated radio-based network to the private radio-based network is further based at least in part on a predicted network utilization of at least one of: the private radio-based network or the CSP-operated radio-based network.

11. The computer-implemented method of claim 7, wherein the CSP-operated radio-based network has a greater signal-to-noise ratio at the UE device than the private radio-based network.

12. The computer-implemented method of claim 7, wherein the cellular network standard utilized by each of the private radio-based network and the CSP-operated radio-based network comprises a Third Generation Partnership Project (3GPP)-defined cellular Radio Access Technology (RAT).

13. A computer-implemented method, comprising:

determining that a network utilization of a private radio-based network is predicted to meet a utilization threshold;

identifying a user equipment (UE) device connected to the private radio-based network, wherein the UE device is capable of connecting to a CSP-operated radio-based network;

determining to switch a wireless network connection in the UE device from the private radio-based network to the CSP-operated radio-based network to reduce the network utilization on the private radio-based network; and causing the wireless network connection in the UE device to switch from the private radio-based network to the CSP-operated radio-based network, wherein each of the private radio-based network and the CSP-operated radio-based network utilizes a cellular network standard.

14. The computer-implemented method of claim 13, wherein causing the wireless network connection in the UE device to switch from the private radio-based network to the CSP-operated radio-based network further comprises causing the wireless network connection in the UE device to switch from the private radio-based network to the CSP-operated radio-based network at a predetermined time.

15. The computer-implemented method of claim 13, wherein causing the wireless network connection in the UE device to switch from the private radio-based network to the CSP-operated radio-based network further comprises instructing an application executed in the UE device to switch the wireless network connection from the private radio-based network to the CSP-operated radio-based network.

16. The computer-implemented method of claim 13, wherein causing the wireless network connection in the UE device to switch from the private radio-based network to the CSP-operated radio-based network further comprises causing the private radio-based network to disconnect the wireless network connection with the UE device.

17. The computer-implemented method of claim 13, wherein determining that the network utilization of the private radio-based network is predicted to meet the utilization threshold is based at least in part on historical network utilization data.

18. The computer-implemented method of claim 13, wherein identifying the UE device is based at least in part on a classification assigned to the UE device.

19. The computer-implemented method of claim 13, wherein identifying the UE device is based at least in part on at least one of: a current location of the UE device, or a predicted location of the UE device.

20. The computer-implemented method of claim 13, wherein identifying the UE device is based at least in part on determining that the UE device receives a signal from the CSP-operated radio-based network that meets a signal-to-noise threshold.

* * * * *